United States Patent
Raghavan et al.

(10) Patent No.: US 12,028,727 B2
(45) Date of Patent: Jul. 2, 2024

(54) MANAGING FEEDBACK INFORMATION TO ENABLE REFERENCE SIGNAL RECEIVED POWER PREDICTION

(71) Applicant: QUALCOMM Incorporated, San Diego, CA (US)

(72) Inventors: Vasanthan Raghavan, West Windsor Township, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 480 days.

(21) Appl. No.: 17/462,742

(22) Filed: Aug. 31, 2021

(65) Prior Publication Data

US 2023/0066900 A1    Mar. 2, 2023

(51) Int. Cl.
*H04B 17/318* (2015.01)
*H04B 7/06* (2006.01)
*H04W 16/28* (2009.01)
*H04W 24/08* (2009.01)

(52) U.S. Cl.
CPC .......... *H04W 24/08* (2013.01); *H04B 7/0617* (2013.01); *H04B 17/318* (2015.01); *H04W 16/28* (2013.01)

(58) Field of Classification Search
CPC .. H04B 7/0452; H04B 7/0617; H04B 7/0695; H04B 7/086; H04B 17/318; H04W 16/28; H04W 52/0225; H04W 72/0446; H04W 72/085
See application file for complete search history.

(56) References Cited

U.S. PATENT DOCUMENTS

| 2019/0116605 | A1* | 4/2019 | Luo | H04W 72/0446 |
| 2022/0095265 | A1* | 3/2022 | Cha | H04W 64/006 |
| 2024/0039611 | A1* | 2/2024 | Alcaraz López | H04B 7/0696 |

OTHER PUBLICATIONS

Partial International Search Report—PCT/US2022/039305—ISA/EPO—dated Oct. 24, 2022 (2103088WO).
International Search Report and Written Opinion—PCT/US2022/039305—ISA/EPO—dated Dec. 15, 2022 (2103088WO).

\* cited by examiner

*Primary Examiner* — Michael Thier
*Assistant Examiner* — Prince A Mensah
(74) *Attorney, Agent, or Firm* — Holland & Hart LLP

(57) ABSTRACT

Methods, systems, and devices for wireless communication are described. A communication device may receive control signaling indicating a configuration for reporting a set of beam angle measurement values between at least two beams relative to a respective beam of a set of beams and a phase difference measurement value between post-beamformed channel phases using the at least two beams of the set of beams. In some examples, the communication device may determine a set of reference signal received power (RSRP) measurement values associated with the at least two beams of the set of beams. The communication device may transmit a report including the set of beam angle measurement values and the phase difference measurement value based on receiving the control signaling indicating the configuration. For example, the communication device may report the RSRP measurement values associated with the at least two beams of the set of beams.

30 Claims, 16 Drawing Sheets

MANAGING FEEDBACK INFORMATION TO ENABLE REFERENCE SIGNAL RECEIVED POWER PREDICTION

FIELD OF TECHNOLOGY

The following relates to wireless communication, including managing feedback information to enable reference signal received power (RSRP) prediction.

BACKGROUND

Wireless communications systems are widely deployed to provide various types of communication content such as voice, video, packet data, and the like. These wireless communications systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting beamformed wireless communication for multiple communication devices, which may be otherwise known as user equipment (UE). These communication devices may use synchronization signal blocks (SSBs) to measure a corresponding RSRP value to determine a quality (e.g., quality of service (QoS)) of the beamformed wireless communication. In some cases, if an RSRP value degrades (e.g., an RSRP value below an RSRP value threshold), the communication devices may perform additional beam management operations, which may increase a consumption of power and computational resources at the communication devices, as well as latency for the beamformed wireless communication.

SUMMARY

The described techniques relate to improved methods, systems, devices, and apparatuses that enable predicting an RSRP for beamformed wireless communication between communication devices by exchanging feedback information between the communication devices (e.g., base stations, UEs). A communication device, for example, a UE may determine (e.g., measure) RSRP values associated with beams used for the beamformed wireless communication. After determining the RSRP values, the communication device may determine (e.g., measure) beam angles between respective beams (e.g., at least two beams with the highest RSRP values) and a target beam. Additionally or alternatively, the communication device may determine a phase difference measurement value between post-beamformed channel phases using the respective beams (e.g., measure a phase between at least two beams with the highest RSRP values). Based on these determinations, the communication device may report the determined beam angles measurements and phase difference measurement value as feedback information, which may be used by another communication device (e.g., a base station) to construct a predictive RSRP interpolation for the beamformed wireless communication. By enabling the predictive RSRP interpolation, the communication devices may experience reduced latency and computational resources, resulting in an overall improvement in efficiency for the beamformed wireless communication.

A method for wireless communication at a device is described. The method may include receiving control signaling indicating a configuration for reporting a set of multiple beam angle measurement values between at least two beams relative to a respective beam of a set of multiple beams and a phase difference measurement value between post-beamformed channel phases using the at least two beams of the set of multiple beams and transmitting a report including the set of multiple beam angle measurement values and the phase difference measurement value based on receiving the control signaling indicating the configuration.

An apparatus for wireless communication at a device is described. The apparatus may include a processor, memory coupled with the processor, and instructions stored in the memory. The instructions may be executable by the processor to cause the apparatus to receive control signaling indicating a configuration for reporting a set of multiple beam angle measurement values between at least two beams relative to a respective beam of a set of multiple beams and a phase difference measurement value between post-beamformed channel phases using the at least two beams of the set of multiple beams and transmit a report including the set of multiple beam angle measurement values and the phase difference measurement value based on receiving the control signaling indicating the configuration.

Another apparatus for wireless communication at a device is described. The apparatus may include means for receiving control signaling indicating a configuration for reporting a set of multiple beam angle measurement values between at least two beams relative to a respective beam of a set of multiple beams and a phase difference measurement value between post-beamformed channel phases using the at least two beams of the set of multiple beams and means for transmitting a report including the set of multiple beam angle measurement values and the phase difference measurement value based on receiving the control signaling indicating the configuration.

A non-transitory computer-readable medium storing code for wireless communication at a device is described. The code may include instructions executable by a processor to receive control signaling indicating a configuration for reporting a set of multiple beam angle measurement values between at least two beams relative to a respective beam of a set of multiple beams and a phase difference measurement value between post-beamformed channel phases using the at least two beams of the set of multiple beams and transmit a report including the set of multiple beam angle measurement values and the phase difference measurement value based on receiving the control signaling indicating the configuration.

Some examples of the method, apparatuses, and non-transitory computer-readable medium described herein may further include operations, features, means, or instructions for determining a set of multiple RSRP measurement values associated with the at least two beams of the set of multiple beams based on receiving the control signaling indicating the configuration, where transmitting the report includes and transmitting the set of multiple beam angle measurement values, the phase difference measurement value, and the set of multiple RSRP measurement values.

Some examples of the method, apparatuses, and non-transitory computer-readable medium described herein may further include operations, features, means, or instructions for enabling a beam training mode based on receiving the control signaling indicating the configuration and where determining the set of multiple RSRP measurement values associated with the at least two beams of the set of multiple beams may be based on enabling the beam training mode.

Some examples of the method, apparatuses, and non-transitory computer-readable medium described herein may further include operations, features, means, or instructions for determining the set of multiple beam angle measurement values between the at least two beams relative to the respective beam of the set of multiple beams based on receiving the control signaling indicating the configuration and where transmitting the report may be based on determining the set of multiple beam angle measurement values between the at least two beams relative to the respective beam of the set of multiple beams.

Some examples of the method, apparatuses, and non-transitory computer-readable medium described herein may further include operations, features, means, or instructions for applying an inverse cosine operation to an inner product of the at least two beams and the respective beam of the set of multiple beams and where determining the set of multiple beam angle measurement values between the at least two beams relative to the respective beam of the set of multiple beams may be based on applying the inverse cosine operation to the inner product of the at least two beams and the respective beam of the set of multiple beams.

Some examples of the method, apparatuses, and non-transitory computer-readable medium described herein may further include operations, features, means, or instructions for determining one or more of a set of beam weights from an analog beamforming codebook associated with the device or a set of multiple beam weights associated with the set of multiple beams based on receiving the control signaling indicating the configuration and where determining the set of multiple beam angle measurement values between the at least two beams relative to the respective beam of the set of multiple beams may be based on one or more of the set of beam weights from the analog beamforming codebook associated with the device or the set of multiple beam weights associated with the set of multiple beams.

Some examples of the method, apparatuses, and non-transitory computer-readable medium described herein may further include operations, features, means, or instructions for determining the phase difference measurement value between the post-beamformed channel phases using the at least two beams of the set of multiple beams based on receiving the control signaling indicating the configuration and where transmitting the report may be based on determining the phase difference measurement value between the post-beamformed channel phases using the at least two beams of the set of multiple beams.

Some examples of the method, apparatuses, and non-transitory computer-readable medium described herein may further include operations, features, means, or instructions for determining a capability of the device based on the configuration and where determining the phase difference measurement value between the post-beamformed channel phases using the at least two beams of the set of multiple beams may be based on determining the capability of the device.

Some examples of the method, apparatuses, and non-transitory computer-readable medium described herein may further include operations, features, means, or instructions for receiving second control signaling indicating a set of multiple beam angle measurement values determined at a second device between at least two beams relative to a respective beam of the set of multiple beams and a phase difference measurement value determined at the second device between post-beamformed channel phases using the at least two beams of the set of multiple beams.

Some examples of the method, apparatuses, and non-transitory computer-readable medium described herein may further include operations, features, means, or instructions for estimating an RSRP value for a respective frequency and time based on one or more of the set of multiple beam angle measurement values, the phase difference measurement value, and receiving the second control signaling and performing a beam management operation based on estimating the RSRP value for the respective frequency and time.

In some examples of the method, apparatuses, and non-transitory computer-readable medium described herein, the phase difference measurement value includes an absolute phase difference measurement value.

In some examples of the method, apparatuses, and non-transitory computer-readable medium described herein, the device includes a UE, a base station, a customer premise equipment (CPE), an integrated access and backhaul (IAB) device, a repeater device, a reflect-array device, a relay device, or a sidelink device.

In some examples of the method, apparatuses, and non-transitory computer-readable medium described herein, the set of multiple beams may be associated with a millimeter (mmW) radio frequency spectrum band.

A method for wireless communication at a device is described. The method may include receiving a report indicating a first set of multiple beam angle measurement values determined at another device between at least two beams relative to a respective beam of a first set of multiple beams and a first phase difference measurement value determined at the other device between first post-beamformed channel phases using the at least two beams of the first set of multiple beams, estimating an RSRP value for a respective frequency and time based on one or more of a second set of multiple beam angle measurement values determined at the device, a second phase difference measurement value determined at the device, and receiving the report, and performing a beam management operation based on estimating the RSRP value for the respective frequency and time.

An apparatus for wireless communication at a device is described. The apparatus may include a processor, memory coupled with the processor, and instructions stored in the memory. The instructions may be executable by the processor to cause the apparatus to receive a report indicating a first set of multiple beam angle measurement values determined at another device between at least two beams relative to a respective beam of a first set of multiple beams and a first phase difference measurement value determined at the other device between first post-beamformed channel phases using the at least two beams of the first set of multiple beams, estimate an RSRP value for a respective frequency and time based on one or more of a second set of multiple beam angle measurement values determined at the device, a second phase difference measurement value determined at the device, and receiving the report, and perform a beam management operation based on estimating the RSRP value for the respective frequency and time.

Another apparatus for wireless communication at a device is described. The apparatus may include means for receiving a report indicating a first set of multiple beam angle measurement values determined at another device between at least two beams relative to a respective beam of a first set of multiple beams and a first phase difference measurement value determined at the other device between first post-beamformed channel phases using the at least two beams of the first set of multiple beams, means for estimating an RSRP value for a respective frequency and time based on one or more of a second set of multiple beam angle measurement values determined at the device, a second phase difference measurement value determined at the device, and receiving the report, and means for performing a beam management operation based on estimating the RSRP value for the respective frequency and time.

A non-transitory computer-readable medium storing code for wireless communication at a device is described. The code may include instructions executable by a processor to receive a report indicating a first set of multiple beam angle measurement values determined at another device between at least two beams relative to a respective beam of a first set of multiple beams and a first phase difference measurement value determined at the other device between first post-beamformed channel phases using the at least two beams of the first set of multiple beams, estimate an RSRP value for a respective frequency and time based on one or more of a second set of multiple beam angle measurement values determined at the device, a second phase difference measurement value determined at the device, and receiving the report, and perform a beam management operation based on estimating the RSRP value for the respective frequency and time.

Some examples of the method, apparatuses, and non-transitory computer-readable medium described herein may further include operations, features, means, or instructions for determining a set of multiple RSRP measurement values associated with at least two beams of a second set of multiple beams and where estimating the RSRP value may be based on the set of multiple RSRP measurement values associated with at least two beams of the second set of multiple beams.

Some examples of the method, apparatuses, and non-transitory computer-readable medium described herein may further include operations, features, means, or instructions for enabling a beam training mode based on a configuration and where determining the set of multiple RSRP measurement values associated with the at least two beams of the second set of multiple beams may be based on enabling the beam training mode.

Some examples of the method, apparatuses, and non-transitory computer-readable medium described herein may further include operations, features, means, or instructions for determining the second set of multiple beam angle measurement values between the at least two beams relative to the respective beam of a second set of multiple beams based on receiving the report and where estimating the RSRP value for the respective frequency and time may be based on determining the second set of multiple beam angle measurement values between the at least two beams relative to the respective beam of the second set of multiple beams.

Some examples of the method, apparatuses, and non-transitory computer-readable medium described herein may further include operations, features, means, or instructions for applying an inverse cosine operation to an inner product of the at least two beams and the respective beam of the second set of multiple beams and where determining the second set of multiple beam angle measurement values between the at least two beams relative to the respective beam of the second set of multiple beams may be based on applying the inverse cosine operation to the inner product of the at least two beams and the respective beam of the second set of multiple beams.

In some examples of the method, apparatuses, and non-transitory computer-readable medium described herein, the device includes a UE, a base station, a CPE, an IAB device, a repeater device, a reflect-array device, a relay device, or a sidelink device.

In some examples of the method, apparatuses, and non-transitory computer-readable medium described herein, the first set of multiple beams may be associated with a mmW radio frequency spectrum band.

DETAILED DESCRIPTION

Figure 1:
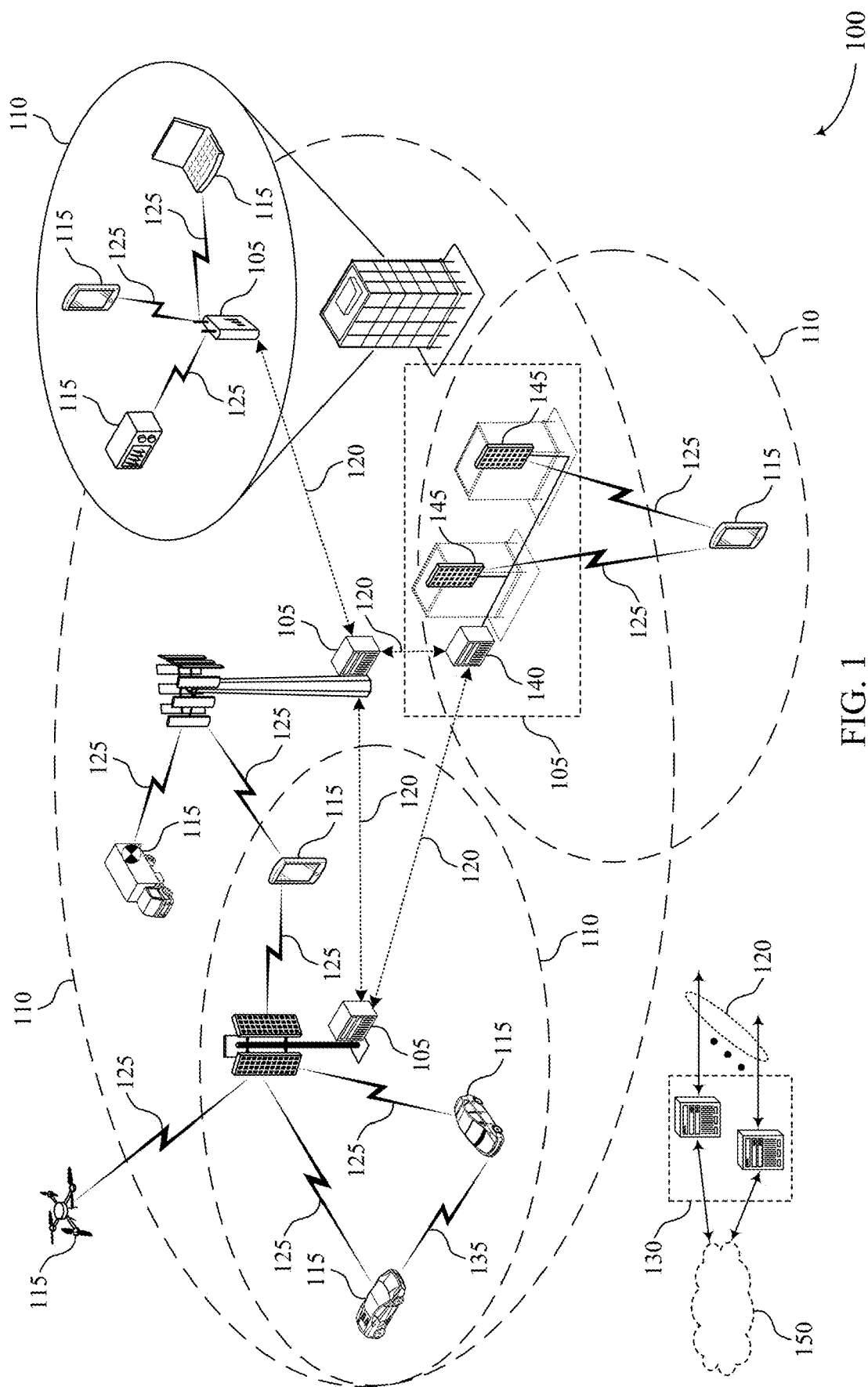
FIGS. 1 and 2 illustrate examples of wireless communications systems that support managing feedback information to enable RSRP prediction in accordance with aspects of the present disclosure.

A wireless communications system may include communication devices, such as a UE or a base station (for example, an eNodeB (eNB), a next-generation NodeB or a giga-NodeB, any of which may be referred to as a gNB, or some other base station), that may support multiple radio access technologies. Examples of radio access technologies include 4G, such as LTE, and 5G, which may be referred to as NR. The communication devices may perform a time-interpolation of RSRP associated with beamformed wireless communication to preemptively adapt to a predicted degradation in RSRP. The communication devices, for example, a base station or a UE may perform operations to interpolate RSRP over time and preemptively adjust parameters (e.g., a modulation and coding scheme (MCS) or other beamforming parameters) without increasing overhead signaling between the communication devices.

In some cases, a UE may enable a linear or auto-regressive filter operation, which use current and previous RSRP values to predict a future RSRP value. In some other cases, the UE may enable a model-free operation (e.g., machine learning or artificial intelligence-based), which uses past RSRP values for training a machine learning network to predict a future RSRP value. The linear or auto-regressive filter operation and the model-free operation may result in increased use of computational resource at the communication devices. Various aspects of the present disclosure relate to enabling the communication devices (e.g., base stations, UEs) to predict an RSRP for beamformed wireless communication by exchanging feedback information between the communication devices (e.g., base stations, UEs).

A communication device, for example, a UE may determine (e.g., measure) RSRP values associated with beams used for the beamformed wireless communication. After determining the RSRP values, the communication device may determine (e.g., measure) beam angles (or angles associated with the main lobe or peak array gain) between respective beams (e.g., at least two beams with the highest RSRP values) and a target beam. Additionally or alternatively, the communication device may determine a phase difference measurement value between post-beamformed channel phases (e.g., channel phases determined with beamformed transmissions) using the respective beams (e.g., measure a phase difference between at least two beams with the highest RSRP values). Based on these determinations, the communication device may report the determined beam angles measurements and phase difference measurement value as feedback information, which may be used by another communication device (e.g., a base station) to construct a predictive RSRP interpolation for the beamformed wireless communication system. By enabling the predictive RSRP interpolation, the communication devices may experience reduced latency and computational resources, resulting in an overall improvement in efficiency for the beamformed wireless communication.

Aspects of the disclosure are initially described in the context of wireless communications systems. Aspects of the disclosure are further illustrated by and described with reference to apparatus diagrams, system diagrams, and flowcharts that relate to managing feedback information to enable RSRP prediction.

FIG. 1 illustrates an example of a wireless communications system 100 that supports managing feedback information to enable RSRP prediction in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the wireless communications system 100, one or more of a base station 105 or a UE 115 may support techniques for improving wireless communication quality, wireless communication bandwidth, and wireless communication reliability. In some cases, one or more of the base station 105 or the UE 115 may support techniques for adapting to varying conditions within the wireless communications system 100 (e.g., varying clusters or reflectors in a signal path), while support high data rates and high QoS requirements. One or more of the base station 105 or the UE 115 may support beamformed wireless communication. In some cases, the beamformed wireless communication (e.g., information carrying beams) may experience a distortion or obstruction when propagating through free space.

To effectively detect signal (e.g., beamformed wireless communication) quality, one or more of the base station 105 or the UE 115 may perform measurements to classify a strength of a signal (e.g., a beamformed signal). For example, a UE 115 may perform an RSRP measurement of a beamformed signal transmitted from a base station 105 (e.g., an SSB). In some cases, the UE 115 may determine that the beamformed signal transmitted from the base station 105 may lack an appropriate power to support data transfers or a particular MCS, among other examples. In response, the UE 115 may indicate a reduction in an RSRP value to the base station 105, and the base station 105 may adjust (e.g., lower) the MCS or switch to a different beamforming configuration (e.g., switch beams).

In some cases, waiting for the UE 115 to indicate when the RSRP value has dropped below an RSRP threshold may result in increased latency in the wireless communications system 100. In some cases, if the base station 105 determines a new beam configuration may improve beamformed wireless communication quality, the base station 105 and the UE 115 may experience added overhead signaling to establish a new beamforming configuration. To avoid increased overhead signaling, one or more of the base station 105 or the UE 115 may perform a time-interpolation of RSRP corresponding to beamformed wireless communication to preemptively adapt to a predicted drop in the RSRP. One or more of the base station 105 or the UE 115 may perform one or more mathematical operations to interpolate the RSRP over time and preemptively adjust one or more parameters (e.g., an MCS or other beamforming parameters) without added signaling overhead. This adaptation could also be in the form of proactive beam training or RSRP measurement with adjusted beam weights.

In some cases, a UE 115 may enable a linear or auto-regressive filter operation, which uses current and previous RSRP values to predict a future RSRP value. In some other cases, the UE 115 may enable a model-free operation (e.g., machine learning or artificial intelligence), which uses past RSRP values for training a machine learning network to predict a future RSRP value. The linear or auto-regressive filter operation and the model-free operation may result in increased use of computational resource at one or more of the base station 105 or the UE 115. While these operations predict future RSRP values, the base station 105 and the UE 115 do not inform each other on how the RSRP prediction is performed, which may lead to erroneous RSRP prediction values at the base station 105 or the UE 115.

In the wireless communications system 100, one or more of a base station 105 or a UE 115 may be configured to support techniques for RSRP interpolation and prediction by exchanging feedback information (e.g., metrics) between the communication devices (e.g., base stations, UEs). The techniques may allow a deterministic and coordinated operation for one or more of the base station 105 or the UE 115 to interpolate an RSRP value to predict a time evolution of RSRP associated with a target beam. One or more of the base station 105 or the UE 115 may determine (e.g., measure) one or more metrics corresponding to beams associated with the beamformed wireless communication. One or more of the base station 105 or the UE 115 utilize bidirectional signaling to communicate the one or more metrics throughout the wireless communications system 100. In some cases, one or more of the base station 105 or the UE 115 may utilize the one or more exchanged metrics to interpolate an RSRP time evolution profile corresponding to a target beam to determine if the RSRP may degrade over time.

For example, a base station 105 and a UE 115 may establish a set of beams for beamformed communications. The base station 105 and the UE 115 may perform RSRP measurements corresponding to the set of beams. The base station 105 may transmit, to the UE 115, an indication to perform RSRP prediction for a target beam (e.g., a separate beam) to characterize the time evolution of the RSRP value corresponding to the target beam. The UE 115 may, based on the indication, obtain metrics corresponding to the set of beams and the target beam. For example, the UE 115 may measure a first angular difference between a first beam and the target beam; the UE 115 may additionally measure a second angular difference between a second beam and the target beam. Additionally, the UE 115 may obtain a first phase difference between the first beam and the target beam. Similarly, the UE 115 may obtain a second phase difference between the second beam and the target beam.

Based on the obtained metrics (e.g., angular differences and phase differences), the UE 115 may transmit an indication of the obtained metrics to the base station 105. The base station 105, in addition to receiving metrics obtained at the UE 115, may obtain similar metrics corresponding to beams at the base station 105. The base station 105 may utilize the metrics from the UE 115, the metrics obtained at the base station 105, and one or more mathematical operations to construct an RSRP interpolation, where the RSRP interpolation is a function of time and subcarrier. By deriving the predictive RSRP interpolation, the base station 105 may determine whether the RSRP corresponding to the target beam may drift substantially over time. Based on the determination, the base station 105 and the UE 115 may preemptively adapt an associated MCS, or switch to a different beam arrangement altogether, without invoking additional signaling overhead used in response to a drop in RSRP (e.g., −3 dB). Accordingly, overall latency and computational resources may be reduced, resulting in an overall improvement in efficiency in the wireless communications system 100.

Figure 2:
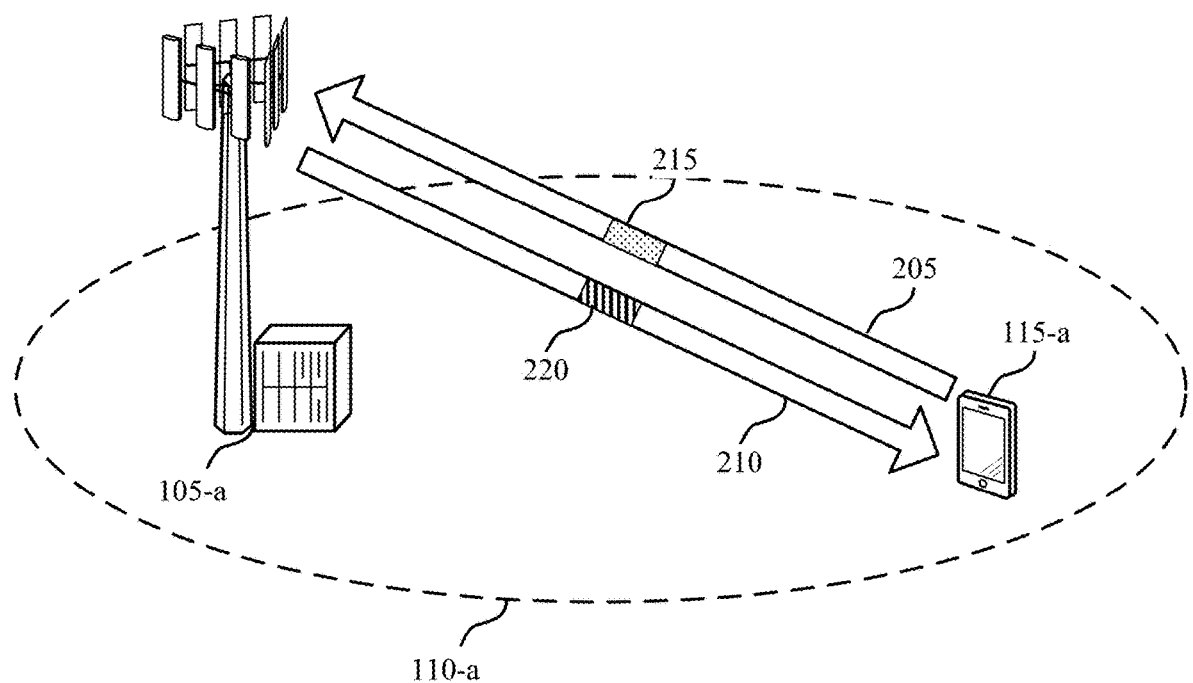

FIG. 2 illustrates an example of a wireless communications system 200 that supports techniques for RSRP interpolation and prediction via metrics derived at wireless devices. The wireless communications system 200 may implement aspects of the wireless communications system 100 or may be implemented by aspects of the wireless communications system 100 as described with reference to FIG. 1. For example, the wireless communications system 200 may include a base station 105-*a* and a UE 115-*a*, which may be examples of a base station 105 and a UE 115 as described with reference to FIG. 1. The base station 105-*a* may serve a geographic coverage area 110-*a*, which may be an example of a geographic coverage area 110 as described with reference to FIG. 1. The wireless communications system 200 may correspond to beamformed wireless communications using a mmW radio frequency spectrum band or the like.

The base station 105-*a* and the UE 115-*a* may be configured with multiple antennas, which may be used to employ techniques such as transmit diversity, receive diversity, multiple-input multiple-output communications, or beamforming, or any combination thereof. The antennas of the base station 105-*a* and the UE 115-*a* may be located within one or more antenna arrays or antenna panels, which may support multiple-input multiple-output operations or transmit or receive beamforming wireless communication. For example, the base station 105-*a* antennas or antenna arrays may be co-located at an antenna assembly, such as an antenna tower. In some examples, antennas or antenna arrays associated with the base station 105-*a* may be located in diverse geographic locations. The base station 105-*a* may have an antenna array with a number of rows and columns of antenna ports that the base station 105-*a* may use to support beamforming wireless communication with the UE 115-*a*. Likewise, the UE 115-*a* may have one or more antenna arrays that may support various multiple-input multiple-output or beamforming operations. Additionally or alternatively, an antenna panel may support radio frequency beamforming for a signal transmitted via one or more antenna ports. The base station 105-*a* and the UE 115-*a* may thus be configured to support beamforming wireless communication using one or multiple antennas.

The base station 105-*a* and the UE 115-*a*, in the wireless communications system 200, may support operations to preserve resources (for example, time and frequency resources of the wireless communications system 200), a battery life of the UE 115-*a*, among other examples. In some examples, the base station 105-*a* and the UE 115-*a* may be configured to support operations to manage or improve beamformed wireless communications between the base station 105-*a* and the UE 115-*a*. For example, the base station 105-*a* and the UE 115-*a* may support one or more operations to perform RSRP measurements. The base station 105-*a* and the UE 115-*a* may use SSBs to perform RSRP measurements (e.g., synchronization signal-RSRP (SS-RSRP)).

Typically, SSBs are a rank-1 signal that may be transmitted along disjoint directions. In some other cases, SSBs may be periodic with varying periodicities (e.g., at 20 ms, 10 ms, 5 ms) depending on a configuration at the base station 105-*a*. While RSRP measurements provide the wireless communications system 200 with measurements corresponding to signal strength and signal integrity, SSB opportunities may not exhibit a fine granularity in time (e.g., the period of SSBs is large compared to variations in the signal). Further, the number of beams can increase as antenna dimensions increase. Given the lack of fine granularity of SSBs, coupled with increasing number of beams, the base station 105-*a* and the UE 115-*a* may support predicting RSRP of a beam pair over time. That is, since the RSRP measurements occur during SSB opportunities, an RSRP may drop during a gap between SSB opportunities. By predicting a time evolution of the RSRP, the base station 105-*a* and the UE 115-*a* may preemptively adjust one or more parameters to compensate for future loss of signal strength associated with beamformed wireless communication.

One way to perform RSRP measurements is to obtain metrics within the wireless communications system 200 to enable RSRP prediction. Such metrics may allow the base station 105-*a* and the UE 115-*a* to determine if RSRP degrades with time and perform a pre-meditated beam switch without waiting for a beam failure recovery procedure. Additionally, such metrics may allow the base station 105-*a* and the UE 115-*a* to determine if beam measurements may be performed as this can allow better power savings and associated thermal decreases. It should be noted that, while metrics may be obtained at the base station 105-*a* and the UE 115-*a*, some techniques may not support communication of the metrics between devices (e.g., the base station 105-*a* and the UE 115-*a*) within the wireless communication system 200. In the aforementioned examples, the lack of bidirectional communication of metrics between the base station 105-*a* and the UE 115-*a* may result in additional measurements, which may increase power consumption and thermal burden on the respective devices.

For example, RSRP measurements of a number of configured transmission configuration indication (TCI) states or beams may be reported. In some cases, if an RSRP report including the RSRP measurements is used to perform time-interpolation, the time-interpolation may be performed as an implementation at the base station 105-*a* and the UE 115-*a* (e.g., no additional signaling between devices within the wireless communications system 200). One possibility for RSRP prediction is to use a filtering approach (e.g., L1/linear, or first-order auto-regressive filter) that uses current and past RSRP values to predict future RSRP values. Higher-order auto-regressive filter models that use more of the past RSRP values is also possible. Another possibility is to use a model-free (e.g., machine learning, artificial intelligence) approach where past RSRP values are used for training a machine learning network and the trained network is used in future and predictive tasks. The number of layers in the machine learning network can be optimized for good predictive performance at the cost of computational complexity. In either of the aforementioned possibilities, the base station 105-*a* and the UE 115-*a* does not inform each other on how it makes a prediction. As such, in the example of FIG. 2, the base station 105-*a* and the UE 115-*a* may support a deterministic set of approaches to RSRP prediction. To realize a more deterministic approach, bidirectional feedback of certain metrics may be utilized between the base station 105-*a* and the UE 115-*a* within the wireless communications system 200 to enable RSRP prediction.

To elucidate one or more aspects of the present disclosure, FIG. 2, along with an accompanying description, describes an exemplary ensemble of the base station 105-*a* and the UE 115-*a* performing deterministic RSRP predictions. However, it should be noted that, while the base station 105-*a* and the UE 115-*a* may be discussed below, any aspects discussed may be implemented by a multitude of wireless devices (e.g., a customer premise equipment (CPE), integrated access and backhaul (IAB) device, a repeater device, a reflect-array device, a relay device, sidelink device, etc.) in any permutation of orders shown, and is not limited to the examples discussed below.

The base station 105-*a* and the UE 115-*a* may communicate over a downlink channel 210 and an uplink channel 205. In some cases, the beamformed wireless communications between the base station 105-*a* and the UE 115-*a* may be occur using a plurality of beams. The base station 105-*a* may determine to initiate predictive RSRP as part of a beam training mode to anticipate future variations in RSRP values corresponding to one or more beams between the base station 105-*a* and the UE 115-*a*. The base station 105-*a* may determine that predictive RSRP may be conducted for one or more target beams. Based on the determination, the base station 105-*a* may transmit, and the UE 115-*a* may receive, a control signal 220 indicating a configuration for reporting a set of metrics corresponding to one or more beams, including the one or more target beams.

In some cases, the UE 115-*a* may indicate, to the base station 105-*a*, a capability to perform one or more measurements to support beam training and, ultimately, predictive RSRP. Additionally, based on the control signal 220, the UE 115-*a* may enable a beam training mode. The control signal 220 may indicate, to the UE 115-*a*, to perform one or more measurements utilizing beams received at the UE 115-*a*. For example, based on the control signal 220 and enabling the beam training mode, the UE 115-*a* may determine RSRP measurement values associated with any number of received beams. In some cases, the UE 115-*a* may determine from a set of beams, via RSRP measurements, a first beam pair and a second beam pair for use in determining additional metrics as indicated by the base station 105-*a*.

Based on the determination of a first beam pair and a second beam pair, and the configuration indicated by the control signal 220, the UE 115-*a* may determine one or more set of beam weights from an analog beamforming codebook associated with the UE 115-*a* or a plurality of beam weights associated with the received beams based at least in part on the control signal 220. Based on the beam weights, the UE 115-*a* may determine beam angle measurement values between the first beam pair and a target beam. Additionally, the UE 115-*a* may determine a second beam angle measurement value between the second beam pair and the target beam. In other words, the UE 115-*a* may determine angle measurement values between the first and second beam pairs relative to a respective target beam.

In some cases, based on the capability indicated to the base station 105-*a*, the UE 115-*a* may also measure phase difference values between post-beamformed complex channels using the first and second beam pairs based at least in part on the control signal 220. In some cases, the measured phase difference values may correspond to absolute phase difference measurement values. Based on the measurements of the RSRP values, angles, and the phase differences at the UE 115-*a*, the UE 115-*a* may generate a report 215 indicating a set of metrics (e.g., the angles and phase differences). Based at least in part on receiving the control signal 220, the UE 115-*a* may transmit the report 215 to the base station 105-*a*.

In some examples, the base station 105-*a* may perform similar measurements of beams at the base station 105-*a*. For example, based on determining to initiate predictive RSRP and enabling beam training mode, the base station 105-*a* may measure RSRP values of a set of beams received at the base station 105-*a* and subsequently determine a first and second beam pair. Similarly, the base station 105-*a* may determine beam angle measurement values between the first beam pair and a target beam. Additionally, the base station 105-*a* may determine a second beam angle measurement value between the second beam pair and the target beam. In other words, the base station 105-*a* may determine angle measurement values between the first and second beam pair relative to the target beam. In some cases, the base station 105-*a* may also measure phase difference values between post-beamformed complex channels using the first and second beam pair based at least in part on enabling beam training and transmitting the control signal 220 to the UE 115-*a*.

In some cases, the base station 105-*a* may receive the report 215 including the set of metrics measured at the UE 115-*a* corresponding to the target beam. In other words, the base station 105-*a* may receive feedback from the UE 115-*a* indicated the set of metrics corresponding to the predictive RSRP operation initiated by the base station 105-*a*. Based on the report 215, as well as the set of metrics determined at the base station 105-*a* (e.g., RSRP values, angles, and phase differences corresponding to beams received at the base station 105-*a*), the base station 105-*a* may estimate an RSRP value corresponding to the target beam for a respective frequency and time. In other words, the base station 105-*a* may interpolate, given the report 215 and the set of metrics determined at the base station 105-*a*, a predictive RSRP expression that is a function of subcarrier and time. The base station 105-*a* may utilize the interpolated RSRP to determine if the target beam may experience a drop (e.g., −3 dB) in RSRP and perform a beam management operation based at least in part on estimating the RSRP value for the respective frequency and time.

Figure 3:
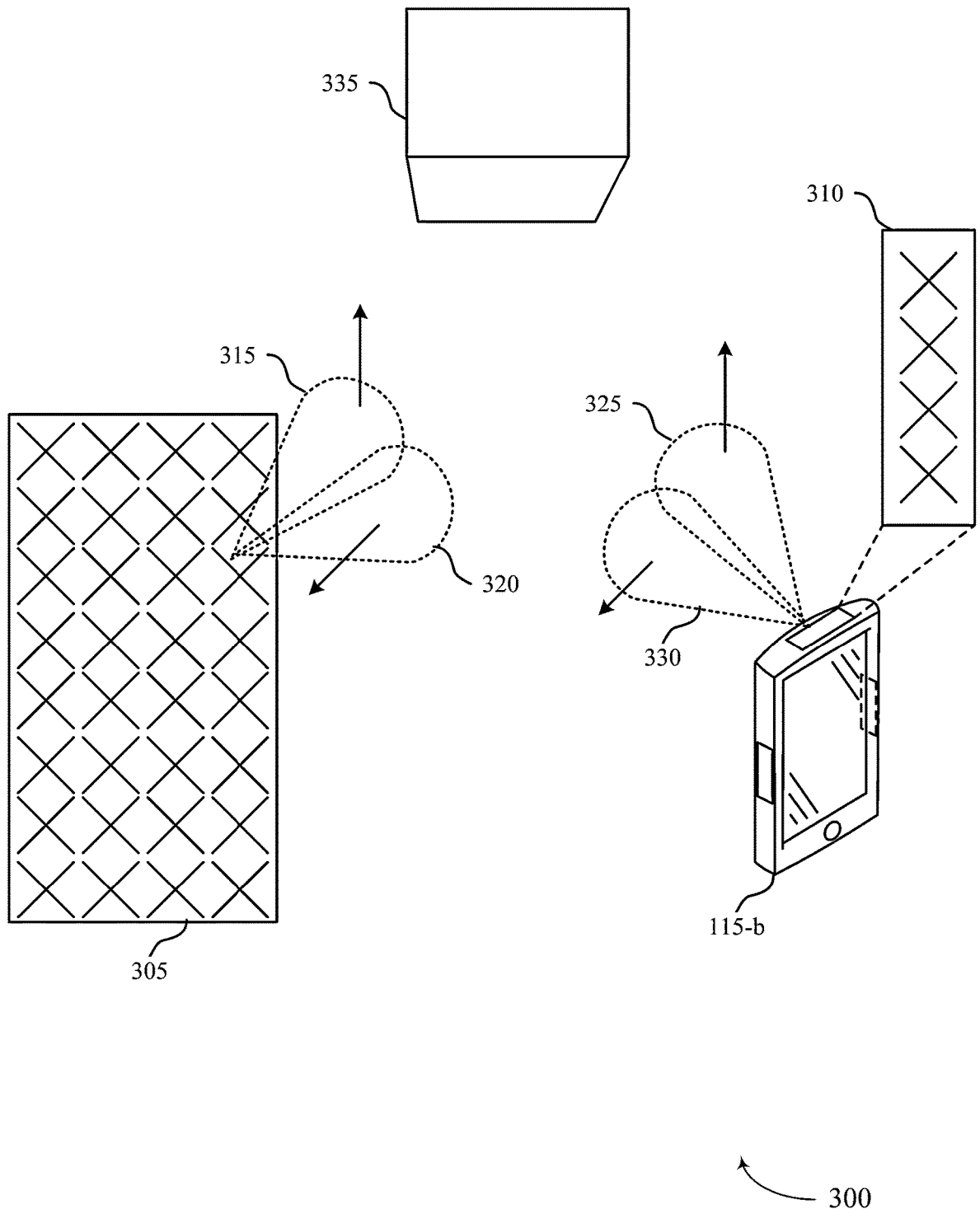
FIG. 3 illustrates an example of a beamforming setup that supports managing feedback information to enable RSRP prediction in accordance with aspects of the present disclosure.

FIG. 3 illustrates an example of a beamforming setup 300 that illustrates techniques for RSRP interpolation and prediction via metrics derived at wireless devices. The beamforming setup 300 may implement aspects of the wireless communications systems 100 and 200 or may be implemented by aspects of the wireless communications systems 100 and 200 as described with reference to FIGS. 1 and 2, respectively. For example, the beamforming setup 300 may implement or be implemented by a base station 105 and a UE 115-*b*, which may be examples of a base station and a UE as described with reference to FIGS. 1 and 2, respectively.

The beamforming setup 300 may include a dual-polarized array 305, which may initialize and perform beamformed wireless communications with the UE 115-*b*. The dual-polarized array 305 may enable beamforming to an antenna array 310 at the UE 115-*b*. It should be noted that the dual-polarized array 305 may correspond to any number of dual-polarized arrays. For example, the dual-polarized array 305 may correspond to a 4×8 array at a base station 105. The dual-polarized array 305 may form a first beam 315 corresponding to a first polarization for beamformed wireless communications with the UE 115-*b*. In some examples, the dual-polarized array 305 may form a second beam 320 corresponding to a second polarization for beamformed wireless communications with the UE 115-*b*.

The UE 115-*b* may establish corresponding beams to enable bidirectional communication with a communication device corresponding to the dual-polarized array 305 (e.g., a base station 105). For example, the UE 115-*b* may instantiate a first UE beam 325, corresponding to the first polarization, and a second UE beam 330, corresponding to the second polarization. In some cases, the base station 105 may determine to initiate procedures for RSRP interpolation. For example, the beamformed wireless communications may be in the presence of a cluster 335 (e.g., reflector), which may lead to a drop in RSRP values at either the base station 105 or the UE 115.

The UE 115-*b* may receive control signaling indicating RSRP interpolation for a target beam. For example, the UE 115-*b* may perform RSRP measurements of the first UE beam 325 and the second UE beam 330 based on the control signal to determine a first beam pair and a second beam pair. The UE 115-*b* may additionally determine one or more set of beam weights, based on the control signal, to be used to measure angular differences between the first UE beam 325 (e.g., a first beam pair) and the target beam. The UE 115-*b* may measure angular differences between the second UE beam 330 (e.g., second beam pair) and the target beam. Additionally, the UE 115-*b* may measure phase differences between the target beam and the first UE beam 325 and the second UE beam 330, respectively. Based on the measurements, the UE 115-*b* may transmit a report indicating the measured RSRP values, the angular differences, and the phase differences, to the base station 105.

A base station 105 may perform similar measurements corresponding to the first beam 315 and the second beam 320 (e.g., RSRP values, angular differences to target beam, phase differences to target beam). Based on the report received from the UE 115-*b* and the measurements obtained at the base station 105, the base station 105 may determine an RSRP interpolation that is a function of subcarrier and time, which may resemble, or be related to, Equation (1):

$$RSRP(k, t) = \frac{1}{2} \cdot \left| \sum_n g_i^H H_{mn}(k, t) f_j \right|^2 \quad (1)$$

where $g_i^H$ is a set of beam weights (i-th beam) used at the UE 115-*b* over the m-th polarization, $f_j$ is a set of beam weights (j-th beam) used at the base station 105 over the n-th polarization, and $H_{mn}(k, t)$ denotes a channel matrix between the n-th polarization at the base station 105 and the m-th polarization at the UE 115-b for the k-th subband at a time t. For example, $H_{00}$ is a channel between the first polarization at the base station 105 and the first polarization at the UE 115-b, $H_{01}$ is a channel between the second polarization at the base station 105 and the first polarization at the UE 115-b, $H_{10}$ is a channel between the first polarization at the base station 105 and the second polarization at the UE 115-b, and $H_{11}$ is a channel polarization between the second polarization at the base station 105 and the second polarization at the UE 115-b. It should be noted that (m, n) may be distinct from (i, j) since the former is directed to polarization indices and the latter is directed to beam indices. With SSBs, which are rank 1 signals, a mixed signal may be received across both polarizations (e.g., the first polarization and the second polarization), where the RSRP with the aforementioned beam pair over the k-th subband is given by Equation (1), where $\Sigma_n g_i^H H_{mn}(k, t) f_j$ represents a signal with mixing across polarizations. In some cases, the RSRP interpolation may be further expanded by examining associated terms that define Equation (1). For example, the channel matrix $H_{mn}(k,t)$ may be expanded according to Equation (2):

$$H_{mn}(k, t) = \sum_{l=1}^{L} P_l \cdot \left[ F_{m,l}^{\Theta} F_{m,l}^{\Phi} \right] \cdot \begin{bmatrix} e^{j\nu_{\Theta\Theta,l}} & \frac{e^{j\nu_{\Theta\Phi,l}}}{\sqrt{XPR}} \\ \frac{e^{j\nu_{\Phi\Theta,l}}}{\sqrt{XPR}} & e^{j\nu_{\Phi\Phi,l}} \end{bmatrix} \cdot \begin{bmatrix} (F_{n,l}^{\Theta})^H \\ (F_{n,l}^{\Phi})^H \end{bmatrix} \cdot e^{-j\frac{2\pi}{N_{FFT}} \cdot kD_l} \cdot e^{j\frac{2\pi\nu t}{\lambda} \vec{r}_{rx,l} \cdot \vec{v}}; \quad (2)$$

$$\text{where } D_l = \left\lfloor \frac{\tau_l}{\frac{1}{\Delta_f \cdot N_{FFT}}} \right\rfloor \text{ and } \Delta_f \cdot N_{FFT} = W$$

where, for the kth subband, $P_l$ is a complex gain of an l-th cluster of L total clusters, $[F_{m,l}^{\Theta} F_{m,l}^{\Phi}]$ are the UE 115-b side polarization-based steering vectors, $$\begin{bmatrix} e^{j\nu_{\Theta\Theta,l}} & \frac{e^{j\nu_{\Theta\Phi,l}}}{\sqrt{XPR}} \\ \frac{e^{j\nu_{\Phi\Theta,l}}}{\sqrt{XPR}} & e^{j\nu_{\Phi\Phi,l}} \end{bmatrix}$$

is a mixing matrix per cluster, $$\begin{bmatrix} (F_{n,l}^{\Theta})^H \\ (F_{n,l}^{\Phi})^H \end{bmatrix}$$

are the base station 105 side polarization-based steering vectors, $$e^{-j\frac{2\pi}{N_{FFT}} \cdot kD_l}$$

represents frequency selectivity, $$e^{j\frac{2\pi\nu t}{\lambda} \vec{r}_{rx,l} \cdot \vec{v}}$$

represents an impact due to mobility (e.g., time selectivity), and $D_l$ represents a discrete delay corresponding to the l-th cluster.

It can be seen that, using the expanded $H_{mn}(k,t)$, RSRP(k, t) can be expanded to Equation (3):

$$RSRP(k, t) = \frac{1}{2} \cdot \left| \sum_{l=1}^{L} P_l \cdot e^{-j\frac{2\pi}{N_{FFT}} \cdot kD_l} \cdot e^{j\frac{2\pi\nu t}{\lambda} \vec{r}_{rx,l} \cdot \vec{v}} \cdot g_i^H \left[ F_{m,l}^{\Theta} F_{m,l}^{\Phi} \right] \cdot \begin{bmatrix} e^{j\nu_{\Theta\Theta,l}} & \frac{e^{j\nu_{\Theta\Phi,l}}}{\sqrt{XPR}} \\ \frac{e^{j\nu_{\Phi\Theta,l}}}{\sqrt{XPR}} & e^{j\nu_{\Phi\Phi,l}} \end{bmatrix} \cdot \begin{bmatrix} (F_{0,l}^{\Theta} + F_{1,l}^{\Theta})^H \\ (F_{0,l}^{\Phi} + F_{1,l}^{\Phi})^H \end{bmatrix} \cdot f_j \right|^2 \quad (3)$$

While Equation (3) appears complex, a scenario where a channel includes L=2 dominant clusters 335. Example scenarios could be line of sight (LOS) path and a singular dominant reflection/Non-LOS path. By incorporating the aforementioned scenario, RSRP(k, t) reduces to Equation (4):

$$2 \cdot RSRP(k, t) = |P_1|^2 \cdot \left| g_i^H \left[ F_{m,1}^{\Theta} F_{m,1}^{\Phi} \right] \cdot \begin{bmatrix} e^{j\nu_{\Theta\Theta,1}} & \frac{e^{j\nu_{\Theta\Phi,1}}}{\sqrt{XPR}} \\ \frac{e^{j\nu_{\Phi\Theta,1}}}{\sqrt{XPR}} & e^{j\nu_{\Phi\Phi,1}} \end{bmatrix} \cdot \begin{bmatrix} (F_{0,1}^{\Theta} + F_{1,1}^{\Theta})^H \\ (F_{0,1}^{\Phi} + F_{1,1}^{\Phi})^H \end{bmatrix} \cdot f_j \right|^2 + |P_2|^2 \cdot \left| g_i^H \left[ F_{m,2}^{\Theta} F_{m,2}^{\Phi} \right] \cdot \begin{bmatrix} e^{j\nu_{\Theta\Theta,2}} & \frac{e^{j\nu_{\Theta\Phi,2}}}{\sqrt{XPR}} \\ \frac{e^{j\nu_{\Phi\Theta,2}}}{\sqrt{XPR}} & e^{j\nu_{\Phi\Phi,2}} \end{bmatrix} \cdot \begin{bmatrix} (F_{0,2}^{\Theta} + F_{1,2}^{\Theta})^H \\ (F_{0,2}^{\Phi} + F_{1,2}^{\Phi})^H \end{bmatrix} \cdot f_j \right|^2 + $$

$$2|P_1||P_2| \cdot \left| g_i^H \left[ F_{m,1}^{\Theta} F_{m,1}^{\Phi} \right] \cdot \begin{bmatrix} e^{j\nu_{\Theta\Theta,1}} & \frac{e^{j\nu_{\Theta\Phi,1}}}{\sqrt{XPR}} \\ \frac{e^{j\nu_{\Phi\Theta,1}}}{\sqrt{XPR}} & e^{j\nu_{\Phi\Phi,1}} \end{bmatrix} \cdot \begin{bmatrix} (F_{0,1}^{\Theta} + F_{1,1}^{\Theta})^H \\ (F_{0,1}^{\Phi} + F_{1,1}^{\Phi})^H \end{bmatrix} \cdot f_j \right| \cdot$$

$$\left| g_i^H \left[ F_{m,2}^{\Theta} F_{m,2}^{\Phi} \right] \cdot \begin{bmatrix} e^{j\nu_{\Theta\Theta,2}} & \frac{e^{j\nu_{\Theta\Phi,2}}}{\sqrt{XPR}} \\ \frac{e^{j\nu_{\Phi\Theta,2}}}{\sqrt{XPR}} & e^{j\nu_{\Phi\Phi,2}} \end{bmatrix} \cdot \begin{bmatrix} (F_{0,2}^{\Theta} + F_{1,2}^{\Theta})^H \\ (F_{0,2}^{\Phi} + F_{1,2}^{\Phi})^H \end{bmatrix} \cdot f_j \right| \cdot \cos(\theta) \quad (4)$$

where $\theta$ is defined according to Equation (5):

$$\theta = \angle P_1 - \angle P_2 + \gamma_1 - \gamma_2 + \frac{2\pi\nu t}{\lambda} \cdot \left( \vec{r}_{rx,1} \cdot \vec{v} - \vec{r}_{rx,2} \cdot \vec{v} \right) - \frac{2\pi k}{N_{FFT}} \cdot (D_1 - D_2) \quad (5)$$

and $\gamma_k$ is, in turn, defined according to Equation (6):

$$\gamma_k = \angle g_i^H [F_{m,k}^\Theta F_{m,k}^\Phi] \cdot \begin{bmatrix} e^{jv\Theta\Theta,k} & \frac{e^{jv\Theta\Phi,k}}{\sqrt{XPR}} \\ \frac{e^{jv\Phi\Theta,k}}{\sqrt{XPR}} & e^{jv\Phi\Phi,k} \end{bmatrix} \cdot \begin{bmatrix} (F_{0,k}^\Theta + F_{1,k}^\Theta)^H \\ (F_{0,k}^\Phi + F_{1,k}^\Phi)^H \end{bmatrix} \cdot f_j \quad (6)$$

Equation (4), representing an expression for RSRP(k, t), shows that there is a deterministic (e.g., functional) parametric relationship between beam pairs chosen for RSRP evolution (e.g., a first best beam pair and a second best beam pair), channel structure, and inter-cluster temporal dynamics. In some cases, to simplify Equation (4), approximations may be used, as illustrated by Equation (7):

$$|P_1|^2 = \text{RSRP}(k,0)|_{Best\ beam\ pair}$$

$$|P_2|^2 = \text{RSRP}(k,0)|_{Second\ best\ beam\ pair} \quad (7)$$

which, when implemented, leads to Equation (8) and Equation (9):

$$\left| g_i^H [F_{m,1}^\Theta F_{m,1}^\Phi] \cdot \begin{bmatrix} e^{jv\Theta\Theta,1} & \frac{e^{jv\Theta\Phi,1}}{\sqrt{XPR}} \\ \frac{e^{jv\Phi\Theta,1}}{\sqrt{XPR}} & e^{jv\Phi\Phi,1} \end{bmatrix} \cdot \begin{bmatrix} (F_{0,1}^\Theta + F_{1,1}^\Theta)^H \\ (F_{0,1}^\Phi + F_{1,1}^\Phi)^H \end{bmatrix} \cdot f_j \right| = \quad (8)$$

$$\cos(\theta_{gNB, Best\ beam\ pair\ mismatch}) \cdot \cos(\theta_{UE, Best\ beam\ pair\ mismatch})$$

$$\left| g_i^H [F_{m,2}^\Theta F_{m,2}^\Phi] \cdot \begin{bmatrix} e^{jv\Theta\Theta,2} & \frac{e^{jv\Theta\Phi,2}}{\sqrt{XPR}} \\ \frac{e^{jv\Phi\Theta,2}}{\sqrt{XPR}} & e^{jv\Phi\Phi,2} \end{bmatrix} \cdot \begin{bmatrix} (F_{0,2}^\Theta + F_{1,2}^\Theta)^H \\ (F_{0,2}^\Phi + F_{1,2}^\Phi)^H \end{bmatrix} \cdot f_j \right| = \quad (9)$$

$$\cos(\theta_{gNB, 2nd\ Best\ beam\ pair\ mismatch}) \cdot \cos(\theta_{UE, 2nd\ Best\ beam\ pair\ mismatch})$$

where $\theta_{gNB,\ Best\ beam\ pair\ mismatch}$ and $\theta_{UE,\ Best\ beam\ pair\ mismatch}$ denote an angle between the first best beam and the beam for which RSRP evolution is sought at the base station 105 (and the UE 115-b) side (e.g., the target beam). θ, on the other hand, as described by Equation (5), is the phase difference between the phase estimated with a complex channel estimate using the first best beam pair and the second best beam pair.

By utilizing the rewritten expression for an RSRP interpolation function and making the aforementioned approximations, the UE 115-a and the base station 105 may derive an RSRP function of time and subcarrier by obtaining angle differences between the first best and second best pair of beams and a target beam. The UE 115-a may apply these techniques in a multi operation procedure. For example, in a first operation, the UE 115-a may measure RSRP estimates with the best and 2nd best beam pair during beam training, initial acquisition, or the like. In a second operation, the UE 115-a may determine angles between the best and 2nd best beam at its end and the UE side beam for which RSRP evolution over time is sought. For example, the UE 115-a may apply an inverse cosine operation to an inner product of the first best beam pair and the second best beam pair and the target beam according to Equation (10):

$$\cos^{-1}(|g_{target}^H g_i|), i=1,2 \quad (10)$$

where $g_{target}$ is the beam for which RSRP interpolation is sought and $g_i$ are the i-th best beams. The aforementioned computations may be made, as described above, once the UE 115-b side codebook is known and the beam weights for which RSRP evolution is sought is known. In a third operation, the UE 115-a may determine a phase difference between phases estimated for the complex channel H with the best and 2nd best beam pair. Performance of the third operation may be based on the UE 115-a having a capability to make phase measurements or using more RSRP measurements to estimate phases. In a fourth operation, the base station 105 determines angles between the best and 2nd best beam at its end and a base station beam for which RSRP evolution is sought, Once Equation (10) is performed at the UE 115-b, the UE 115-b may report an output of Equation (10), along with phase differences and measured RSRP values, to the base station 105. For example, in a fifth operation, the UE 115-a feeds back the RSRP metrics estimated in the first operation, angle metrics estimated in the second operation, and a phase difference estimate the third operation. Similarly, the aforementioned approximations and computations may be made at the base station 105. Based on the computations performed, coupled with bidirectional feedback between the base station 105 and the UE 115-b, the base station 105, in a sixth operation, may estimate an RSRP value corresponding to the target beam for a respective frequency and time. For example, base station 105 uses the feedback metrics from the first operation along with angle metrics estimated in the fourth operation to compute an approximation to RSRP(k,t). In other words, the base station 105 may interpolate, given the report and a set of metrics determined at the base station 105, a predictive RSRP expression (e.g., analogous to Equation (1)) that is a function of subcarrier and time. The base station 105 may utilize the interpolated RSRP to determine if the target beam may experience a drop (e.g., −3 dB) in RSRP and perform a beam management operation based at least in part on estimating the RSRP value for the respective frequency and time.

Figure 4:
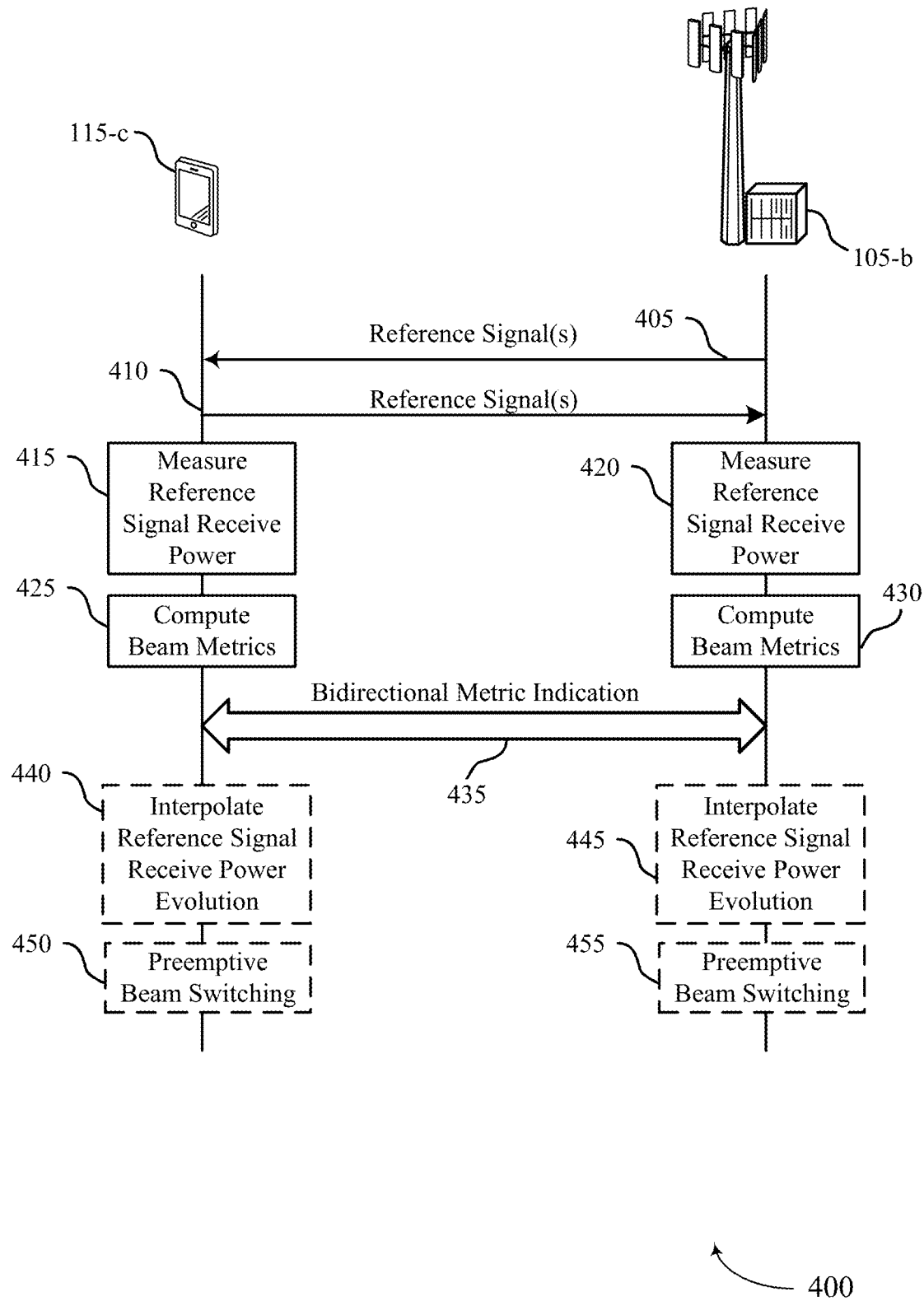
FIG. 4 illustrates an example of a process flow that supports managing feedback information to enable RSRP prediction in accordance with aspects of the present disclosure.

FIG. 4 illustrates an example of a process flow 400 that illustrates techniques for RSRP interpolation and prediction via metrics derived at wireless devices. The process flow 400 may implement aspects of the wireless communications systems 100 and 200 or may be implemented by aspects of the wireless communications systems 100 and 200 as described with reference to FIGS. 1 and 2, respectively. For example, the process flow 400 may implement or be implemented by a base station 105-b and a UE 115-c, which may be examples of a base station and a UE as described with reference to FIGS. 1 through 3. In the following description of the process flow 400, the operations between the base station 105-b and the UE 115-c may be performed in different orders or at different times. Some operations may also be left out of the process flow 400, or other operations may be added.

At 405, the base station 105-b may transmit one or more reference signals to the UE 115-c. For example, the base station 105-b may transmit one or more SSBs to the UE 115-c. At 410, the UE 115-c may transmit one or more reference signals to the base station 105-b. At 415, the UE 115-c may measure RSRP corresponding to a set of beams at the UE 115-c. From the set of beams, the UE 115-c may determine a first beam pair and a second beam pair for performing measurements corresponding to a target beam. Similarly, at 420, the base station 105-b may perform similar measurements (e.g., RSRP values) from a set of beams at the base station 105-b.

At 425, the UE 115-c may determine angular differences between the first beam pair and the second beam pair, as well as the target beam as described herein. Additionally, the UE 115-c may determine phase differences between phases estimated for a complex channel with the first and second beam pair. The phase measurements may be based on the UE 115-c having a capability to make phase measurements or using more RSRP measurements to estimate phases. At 430, the base station 105-c may determine angles between the first and second beam pairs at the base station 105-c, and the base station 105-c side beam for which the RSRP interpolation is sought (e.g., the target beam).

At 435, the UE 115-c, the base station 105-b, or both, may feed back the RSRP metrics estimated at 425 and 430 in support of RSRP interpolation (e.g., transmit a report including feedback information or metrics to the other of UE 115-c and base station 105-b). For example, the base station 105-c may feedback metrics obtained at the base station 105-c to the UE 115-c for RSRP interpolation. Optionally, at 440 the UE 115-c may interpolate an RSRP evolution to characterize the variation of RSRP corresponding to the target beam over time. Based on the characterization of the variation of the RSRP corresponding to the target beam, the UE 115-c may initiate one or more procedures. For example, at 450, the UE 115-c may initiate preemptive beam switching before the target beam drops below an RSRP value (e.g., −3 dB).

Similarly, the UE 115-c may feedback metrics obtained at the UE 115-c to the base station 105-b for RSRP interpolation. Optionally, at 445 the base station 105-b may interpolate an RSRP evolution to characterize the variation of RSRP corresponding to the target beam over time. Based on the characterization of the variation of the RSRP corresponding to the target beam, the base station 105-b may initiate one or more procedures. For example, at 455, the base station 105-b may initiate preemptive beam switching before the target beam drops below an RSRP value (e.g., −3 dB). For example, the base station 105-b may change a transmit beam for downlink transmissions to UE 115-c, may transmit a control message (e.g., DCI, RRC, MAC CE) instructing the UE 115-c to change a receive beam for receiving downlink transmissions, or both. In another example, the base station 105-b may change a receive beam for receiving uplink transmissions to UE 115-c, may transmit a control message (e.g., DCI, RRC, MAC CE) instructing the UE 115-c to change a transmission beam for transmitting uplink transmissions, or both. In some examples, the UE may transmit a control message (e.g., DCI, RRC, MAC CE) requesting that the base station 105-b use a different transmission beam for downlink transmissions, requesting that the base station 105-b use a different receive beam for receiving uplink transmissions, or both.

In some examples, the techniques described herein may provide for a first device to feedback metrics, to a second device, including angle information between a certain beam at its end determined from a beam training process and a beam for which RSRP evolution is sought, a phase of a complex channel response, and RSRPs estimated in the beam training process. In some cases, the number of beams used from the beam training process may be at least two, a phase of the complex channel response may be an absolute phase or relative to one beam pair, a phase of a complex channel response may be estimated directly or via a proxy set of signal strength measurements, or any combination thereof. The second device may use the feedback metrics along with angle information between a certain beam at its end determined from the beam training process and a beam at its end for which RSRP evolution is sought to estimate RSRP values over time. In some cases, the first and second devices may be a UE, CPE, gNB, IAB node, repeater node, relay/sidelink node, etc., or any combination thereof, and such devices may operate at millimeter wave carrier frequencies and above.

Figure 5:
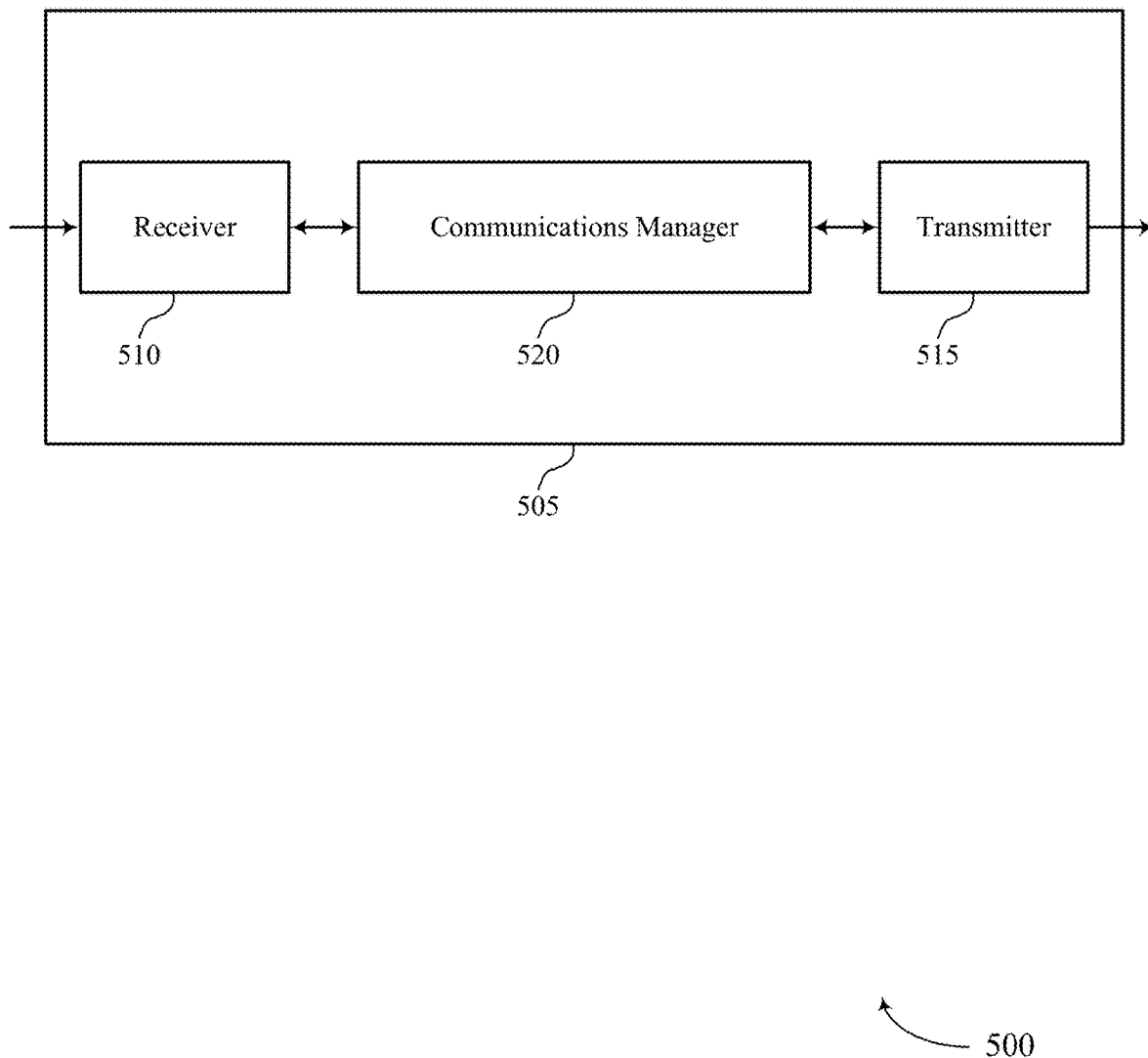
FIGS. 5 and 6 show block diagrams of devices that support managing feedback information to enable RSRP prediction in accordance with aspects of the present disclosure.

FIG. 5 shows a block diagram 500 of a device 505 that supports managing feedback information to enable RSRP prediction in accordance with aspects of the present disclosure. The device 505 may be an example of aspects of a UE 115 or a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to managing feedback information to enable RSRP prediction). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to managing feedback information to enable RSRP prediction). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of managing feedback information to enable RSRP prediction as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at the device 505 in accordance with examples as disclosed herein. For example, the communications manager 520 may be configured as or otherwise support a means for receiving control signaling indicating a configuration for reporting a set of multiple beam angle measurement values between at least two beams relative to a respective beam of a set of multiple beams and a phase difference measurement value between post-beamformed channel phases using the at least two beams of the set of multiple beams. The communications manager 520 may be configured as or otherwise support a means for transmitting a report including the set of multiple beam angle measurement values and the phase difference measurement value based on receiving the control signaling indicating the configuration. By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption.

Figure 6:
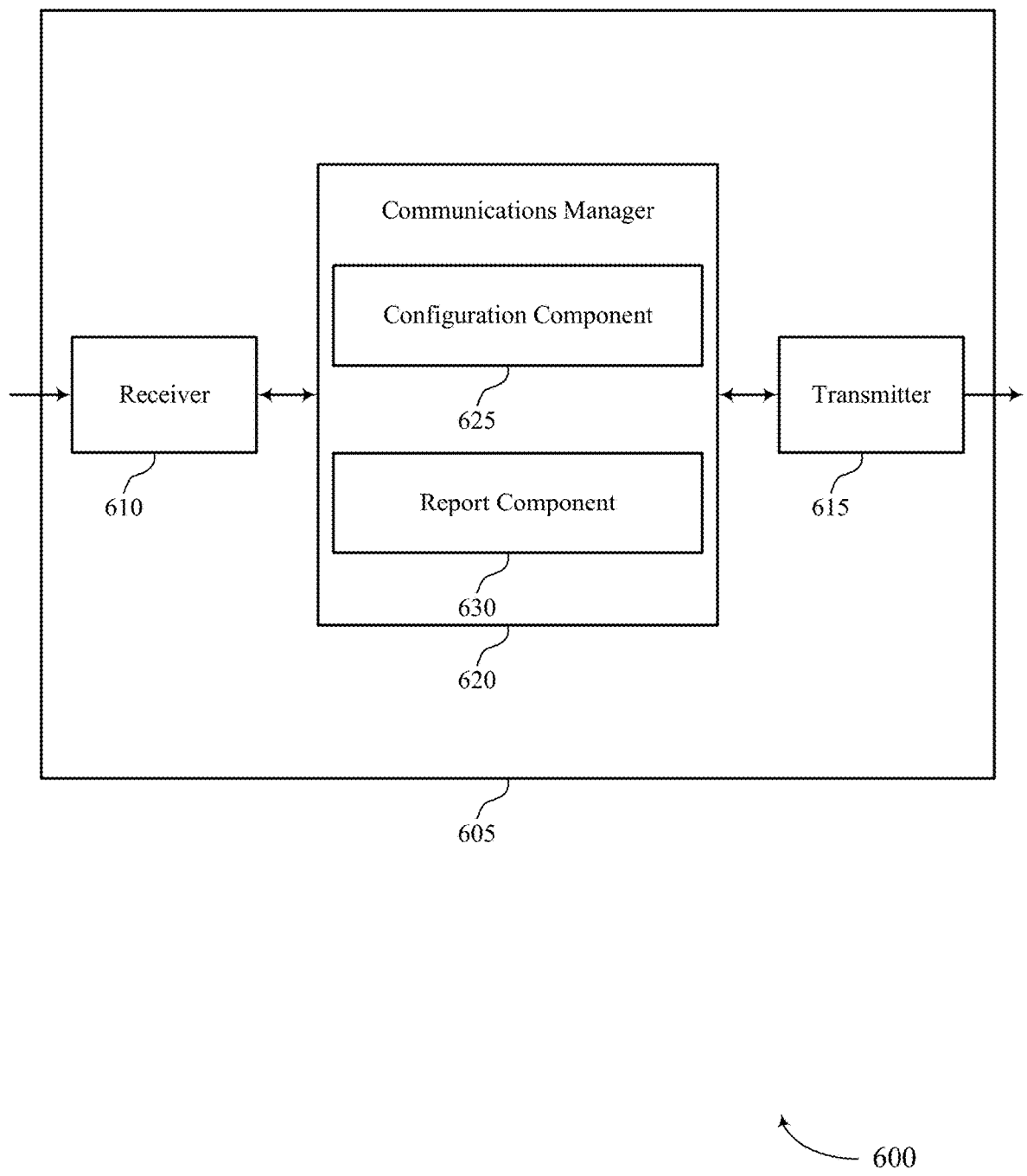

FIG. 6 shows a block diagram 600 of a device 605 that supports managing feedback information to enable RSRP prediction in accordance with aspects of the present disclosure. The device 605 may be an example of aspects of a device 505, a UE 115 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to managing feedback information to enable RSRP prediction). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to managing feedback information to enable RSRP prediction). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of managing feedback information to enable RSRP prediction as described herein. For example, the communications manager 620 may include a configuration component 625 a report component 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at the device 605 in accordance with examples as disclosed herein. The configuration component 625 may be configured as or otherwise support a means for receiving control signaling indicating a configuration for reporting a set of multiple beam angle measurement values between at least two beams relative to a respective beam of a set of multiple beams and a phase difference measurement value between post-beamformed channel phases using the at least two beams of the set of multiple beams. The report component 630 may be configured as or otherwise support a means for transmitting a report including the set of multiple beam angle measurement values and the phase difference measurement value based on receiving the control signaling indicating the configuration.

Figure 7:
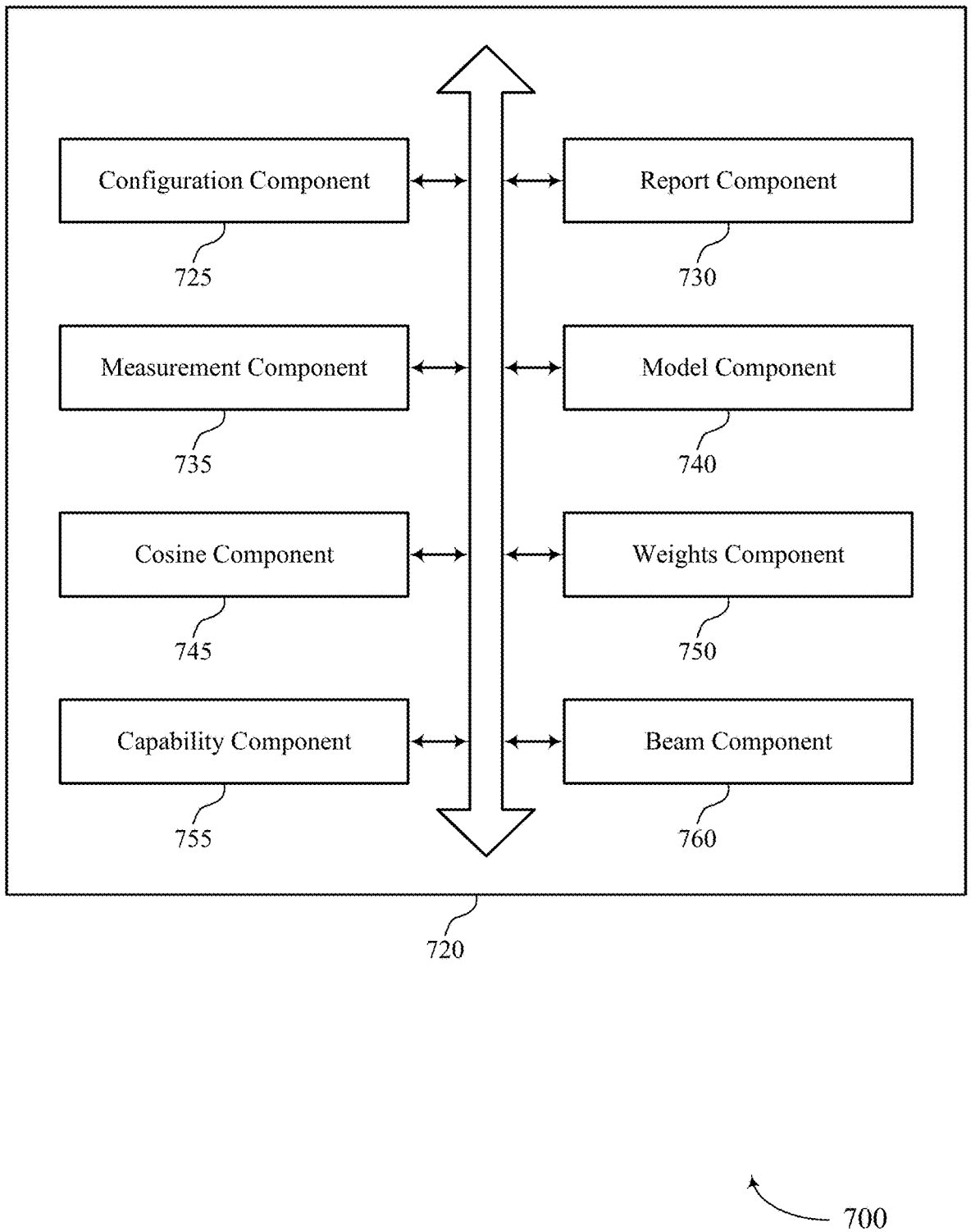
FIG. 7 shows a block diagram of a communications manager that supports managing feedback information to enable RSRP prediction in accordance with aspects of the present disclosure.

FIG. 7 shows a block diagram 700 of a communications manager 720 that supports managing feedback information to enable RSRP prediction in accordance with aspects of the present disclosure. The communications manager 720 may be an example of aspects of a communications manager 520, a communications manager 620, or both, as described herein. The communications manager 720, or various components thereof, may be an example of means for performing various aspects of managing feedback information to enable RSRP prediction as described herein. For example, the communications manager 720 may include a configuration component 725, a report component 730, a measurement component 735, a model component 740, a cosine component 745, a weights component 750, a capability component 755, a beam component 760, or any combination thereof. Each of these components may communicate, directly or indirectly, with one another (e.g., via one or more buses).

The communications manager 720 may support wireless communication at a device (e.g., a UE) in accordance with examples as disclosed herein. The configuration component 725 may be configured as or otherwise support a means for receiving control signaling indicating a configuration for reporting a set of multiple beam angle measurement values between at least two beams relative to a respective beam of a set of multiple beams and a phase difference measurement value between post-beamformed channel phases using the at least two beams of the set of multiple beams. The report component 730 may be configured as or otherwise support a means for transmitting a report including the set of multiple beam angle measurement values and the phase difference measurement value based on receiving the control signaling indicating the configuration.

In some examples, the measurement component 735 may be configured as or otherwise support a means for determining a set of multiple RSRP measurement values associated with the at least two beams of the set of multiple beams based on receiving the control signaling indicating the configuration. In some examples, the report component 730 may be configured as or otherwise support a means for transmitting the set of multiple beam angle measurement values, the phase difference measurement value, and the set of multiple RSRP measurement values. In some examples, the model component 740 may be configured as or otherwise support a means for enabling a beam training mode based on receiving the control signaling indicating the configuration. In some examples, the measurement component 735 may be configured as or otherwise support a means for determining the set of multiple RSRP measurement values associated with the at least two beams of the set of multiple beams based on enabling the beam training mode.

In some examples, the measurement component 735 may be configured as or otherwise support a means for determining the set of multiple beam angle measurement values between the at least two beams relative to the respective beam of the set of multiple beams based on receiving the control signaling indicating the configuration. In some examples, the report component 730 may be configured as or otherwise support a means for transmitting the report based on determining the set of multiple beam angle measurement values between the at least two beams relative to the respective beam of the set of multiple beams. In some examples, the cosine component 745 may be configured as or otherwise support a means for applying an inverse cosine operation to an inner product of the at least two beams and the respective beam of the set of multiple beams. In some examples, the measurement component 735 may be configured as or otherwise support a means for determining the set of multiple beam angle measurement values between the at least two beams relative to the respective beam of the set of multiple beams based on applying the inverse cosine operation to the inner product of the at least two beams and the respective beam of the set of multiple beams.

In some examples, the weights component 750 may be configured as or otherwise support a means for determining one or more of a set of beam weights from an analog beamforming codebook associated with the device or a set of multiple beam weights associated with the set of multiple beams based on receiving the control signaling indicating the configuration. In some examples, the measurement component 735 may be configured as or otherwise support a means for determining the set of multiple beam angle measurement values between the at least two beams relative to the respective beam of the set of multiple beams based on one or more of the set of beam weights from the analog beamforming codebook associated with the device or the set of multiple beam weights associated with the set of multiple beams.

In some examples, the measurement component 735 may be configured as or otherwise support a means for determining the phase difference measurement value between the post-beamformed channel phases using the at least two beams of the set of multiple beams based on receiving the control signaling indicating the configuration. In some examples, the report component 730 may be configured as or otherwise support a means for transmitting the report based on determining the phase difference measurement value between the post-beamformed channel phases using the at least two beams of the set of multiple beams. In some examples, the capability component 755 may be configured as or otherwise support a means for determining a capability of the device based on the configuration. In some examples, the measurement component 735 may be configured as or otherwise support a means for determining the phase difference measurement value between the post-beamformed channel phases using the at least two beams of the set of multiple beams based on determining the capability of the device.

In some examples, the report component 730 may be configured as or otherwise support a means for receiving second control signaling indicating a set of multiple beam angle measurement values determined at a second device between at least two beams relative to a respective beam of the set of multiple beams and a phase difference measurement value determined at the second device between post-beamformed channel phases using the at least two beams of the set of multiple beams. In some examples, the measurement component 735 may be configured as or otherwise support a means for estimating an RSRP value for a respective frequency and time based on one or more of the set of multiple beam angle measurement values, the phase difference measurement value, and receiving the second control signaling. In some examples, the beam component 760 may be configured as or otherwise support a means for performing a beam management operation based on estimating the RSRP value for the respective frequency and time.

In some examples, the phase difference measurement value includes an absolute phase difference measurement value. In some examples, the device includes a UE, a base station, a CPE, an IAB device, a repeater device, a reflectarray device, a relay device, or a sidelink device. In some examples, the set of multiple beams are associated with a mmW radio frequency spectrum band.

Figure 8:
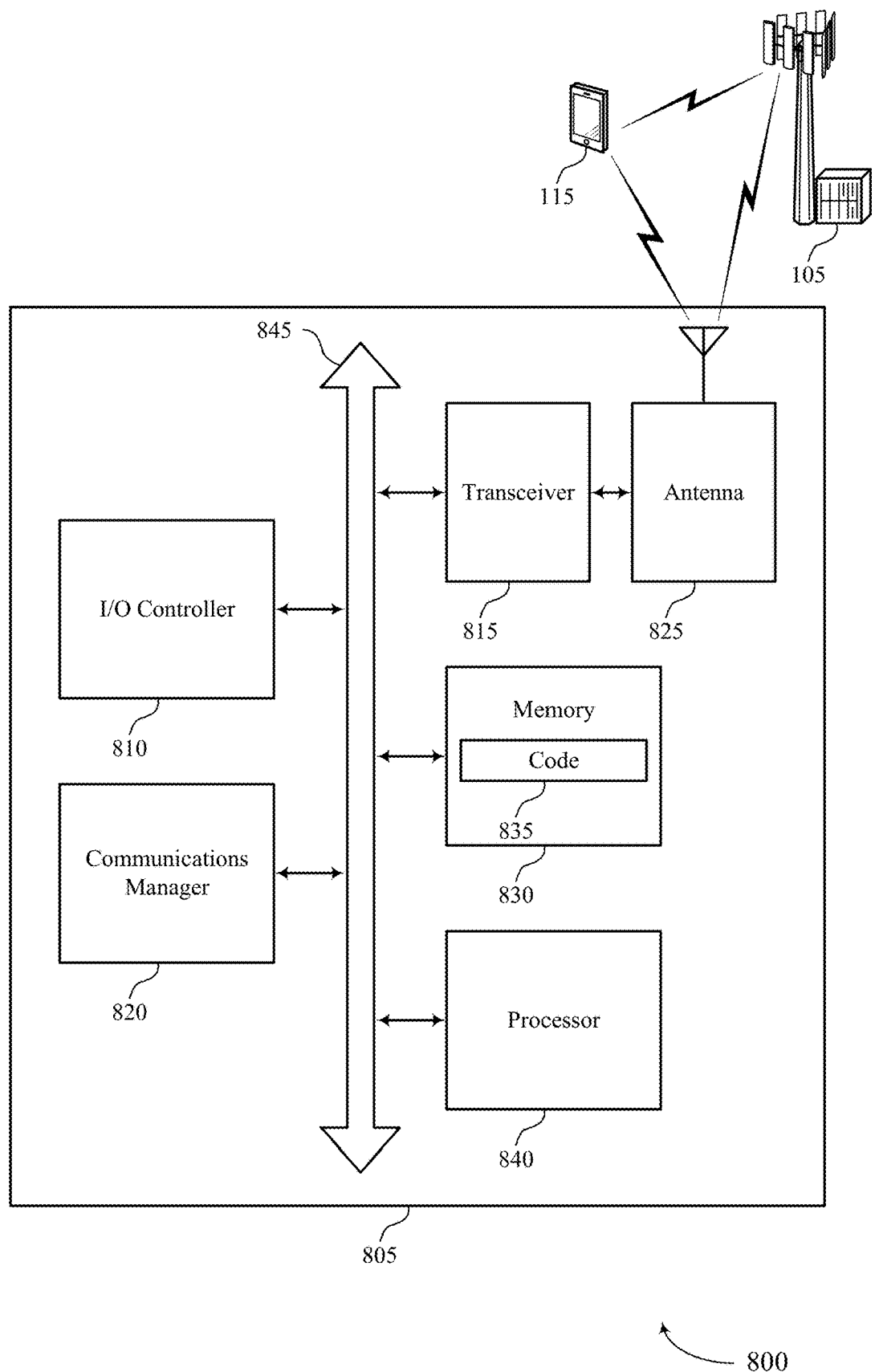
FIG. 8 shows a diagram of a system including a device that supports managing feedback information to enable RSRP prediction in accordance with aspects of the present disclosure.

FIG. 8 shows a diagram of a system 800 including a device 805 that supports managing feedback information to enable RSRP prediction in accordance with aspects of the present disclosure. The device 805 may be an example of or include the components of a device 505, a device 605, a UE 115 or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting managing feedback information to enable RSRP prediction). For example, the device 805 or a component of the device 805 may include a processor 840 and memory 830 coupled to the processor 840, the processor 840 and memory 830 configured to perform various functions described herein.

The communications manager 820 may support wireless communication at the device 805 in accordance with examples as disclosed herein. For example, the communications manager 820 may be configured as or otherwise support a means for receiving control signaling indicating a configuration for reporting a set of multiple beam angle measurement values between at least two beams relative to a respective beam of a set of multiple beams and a phase difference measurement value between post-beamformed channel phases using the at least two beams of the set of multiple beams. The communications manager 820 may be configured as or otherwise support a means for transmitting a report including the set of multiple beam angle measurement values and the phase difference measurement value based on receiving the control signaling indicating the configuration. By including or configuring the communications manager 820 in accordance with examples as described herein, the device 805 may support techniques for improved communication reliability, reduced latency, and reduced power consumption.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of managing feedback information to enable RSRP prediction as described herein, or the processor 840 and the memory 830 may be otherwise configured to perform or support such operations.

Figure 9:
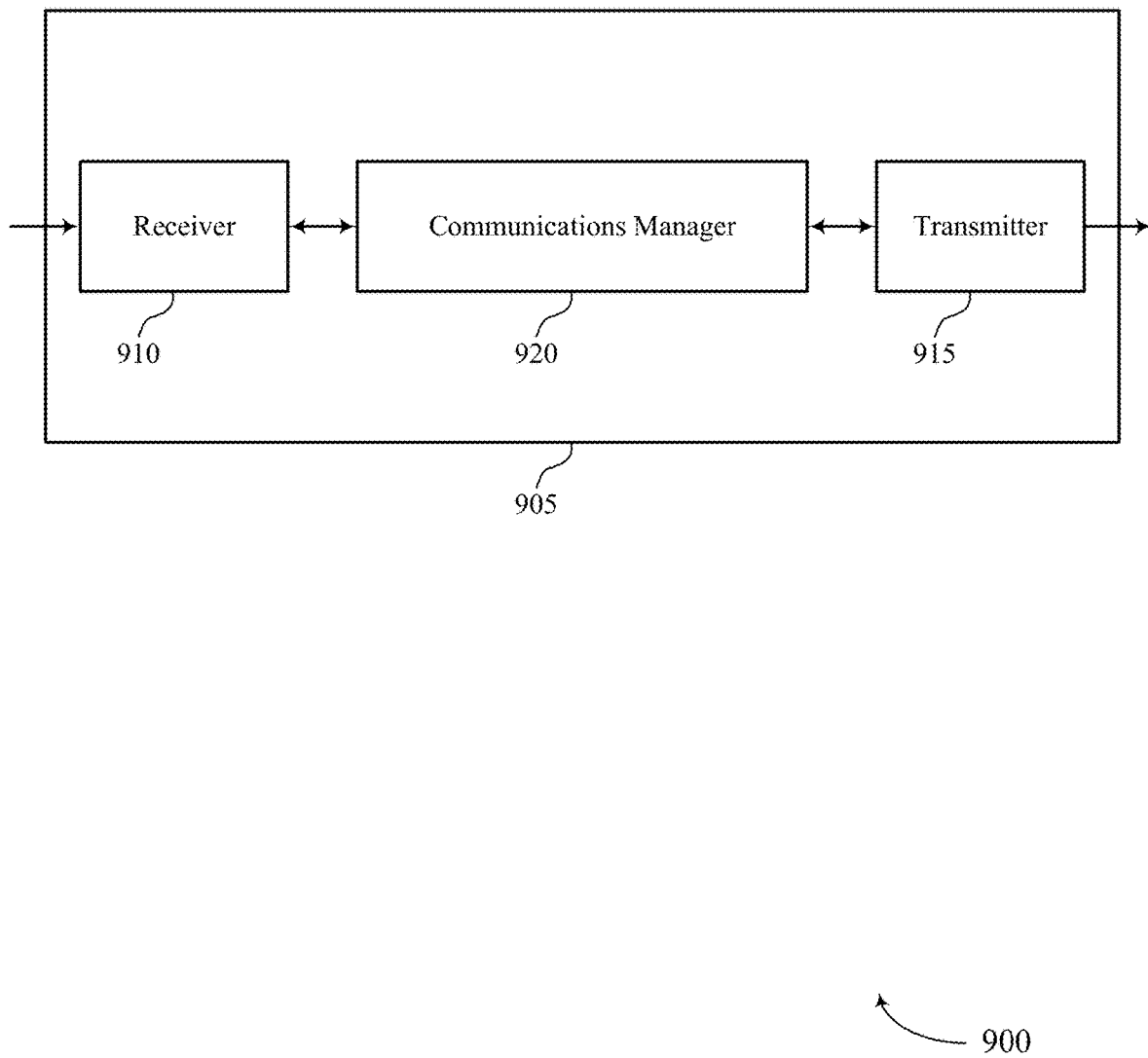
FIGS. 9 and 10 show block diagrams of devices that support managing feedback information to enable RSRP prediction in accordance with aspects of the present disclosure.

FIG. 9 shows a block diagram 900 of a device 905 that supports managing feedback information to enable RSRP prediction in accordance with aspects of the present disclosure. The device 905 may be an example of aspects of a base station 105 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to managing feedback information to enable RSRP prediction). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to managing feedback information to enable RSRP prediction). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of managing feedback information to enable RSRP prediction as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at the device 905 in accordance with examples as disclosed herein. For example, the communications manager 920 may be configured as or otherwise support a means for receiving a report indicating a first set of multiple beam angle measurement values determined at another device between at least two beams relative to a respective beam of a first set of multiple beams and a first phase difference measurement value determined at the other device between first post-beamformed channel phases using the at least two beams of the first set of multiple beams. The communications manager 920 may be configured as or otherwise support a means for estimating an RSRP value for a respective frequency and time based on one or more of a second set of multiple beam angle measurement values determined at the device, a second phase difference measurement value determined at the device, and receiving the report. The communications manager 920 may be configured as or otherwise support a means for performing a beam management operation based on estimating the RSRP value for the respective frequency and time. By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced power consumption.

Figure 10:
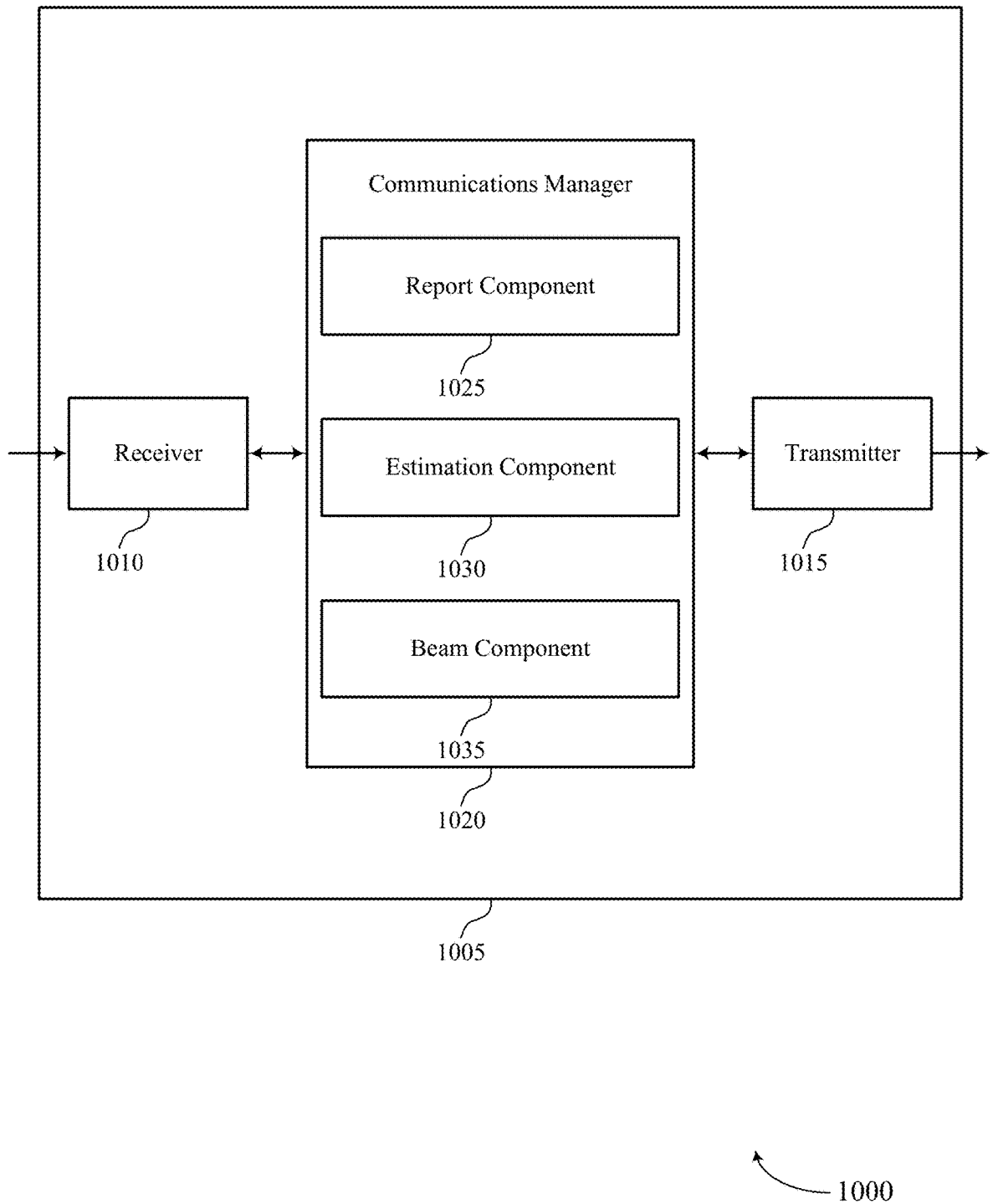

FIG. 10 shows a block diagram 1000 of a device 1005 that supports managing feedback information to enable RSRP prediction in accordance with aspects of the present disclosure. The device 1005 may be an example of aspects of a device 905, a base station 105, or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to managing feedback information to enable RSRP prediction). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to managing feedback information to enable RSRP prediction). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of managing feedback information to enable RSRP prediction as described herein. For example, the communications manager 1020 may include a report component 1025, an estimation component 1030, a beam component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at the device 1005 in accordance with examples as disclosed herein. The report component 1025 may be configured as or otherwise support a means for receiving a report indicating a first set of multiple beam angle measurement values determined at another device between at least two beams relative to a respective beam of a first set of multiple beams and a first phase difference measurement value determined at the other device between first post-beamformed channel phases using the at least two beams of the first set of multiple beams. The estimation component 1030 may be configured as or otherwise support a means for estimating an RSRP value for a respective frequency and time based on one or more of a second set of multiple beam angle measurement values determined at the device, a second phase difference measurement value determined at the device, and receiving the report. The beam component 1035 may be configured as or otherwise support a means for performing a beam management operation based on estimating the RSRP value for the respective frequency and time.

Figure 11:
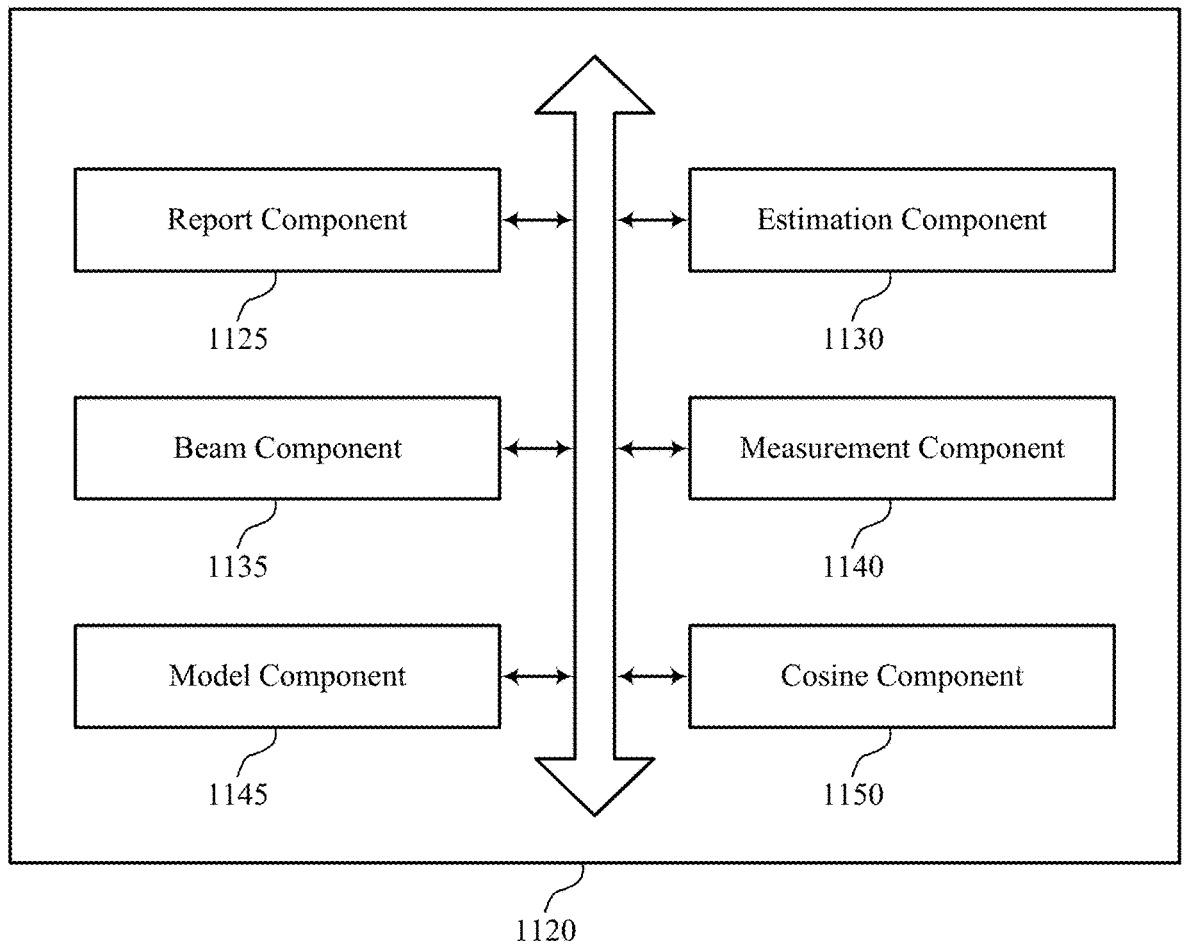
FIG. 11 shows a block diagram of a communications manager that supports managing feedback information to enable RSRP prediction in accordance with aspects of the present disclosure.

FIG. 11 shows a block diagram 1100 of a communications manager 1120 that supports managing feedback information to enable RSRP prediction in accordance with aspects of the present disclosure. The communications manager 1120 may be an example of aspects of a communications manager 920, a communications manager 1020, or both, as described herein. The communications manager 1120, or various components thereof, may be an example of means for performing various aspects of managing feedback information to enable RSRP prediction as described herein. For example, the communications manager 1120 may include a report component 1125, an estimation component 1130, a beam component 1135, a measurement component 1140, a model component 1145, a cosine component 1150, or any combination thereof. Each of these components may communicate, directly or indirectly, with one another (e.g., via one or more buses).

The communications manager 1120 may support wireless communication at a device in accordance with examples as disclosed herein. The report component 1125 may be configured as or otherwise support a means for receiving a report indicating a first set of multiple beam angle measurement values determined at another device between at least two beams relative to a respective beam of a first set of multiple beams and a first phase difference measurement value determined at the other device between first post-beamformed channel phases using the at least two beams of the first set of multiple beams. The estimation component 1130 may be configured as or otherwise support a means for estimating an RSRP value for a respective frequency and time based on one or more of a second set of multiple beam angle measurement values determined at the device, a second phase difference measurement value determined at the device, and receiving the report. The beam component 1135 may be configured as or otherwise support a means for performing a beam management operation based on estimating the RSRP value for the respective frequency and time.

In some examples, the measurement component 1140 may be configured as or otherwise support a means for determining a set of multiple RSRP measurement values associated with at least two beams of a second set of multiple beams. In some examples, the estimation component 1130 may be configured as or otherwise support a means for estimating the RSRP value based on the set of multiple RSRP measurement values associated with at least two beams of the second set of multiple beams. In some examples, the model component 1145 may be configured as or otherwise support a means for enabling a beam training mode based on a configuration. In some examples, the measurement component 1140 may be configured as or otherwise support a means for determining the set of multiple RSRP measurement values associated with the at least two beams of the second set of multiple beams based on enabling the beam training mode.

In some examples, the measurement component 1140 may be configured as or otherwise support a means for determining the second set of multiple beam angle measurement values between the at least two beams relative to the respective beam of a second set of multiple beams based on receiving the report. In some examples, the estimation component 1130 may be configured as or otherwise support a means for estimating the RSRP value for the respective frequency and time based on determining the second set of multiple beam angle measurement values between the at least two beams relative to the respective beam of the second set of multiple beams.

In some examples, the cosine component 1150 may be configured as or otherwise support a means for applying an inverse cosine operation to an inner product of the at least two beams and the respective beam of the second set of multiple beams. In some examples, the measurement component 1140 may be configured as or otherwise support a means for determining the second set of multiple beam angle measurement values between the at least two beams relative to the respective beam of the second set of multiple beams based on applying the inverse cosine operation to the inner product of the at least two beams and the respective beam of the second set of multiple beams. In some examples, the device includes a UE, a base station, a CPE, an IAB device, a repeater device, a reflect-array device, a relay device, or a sidelink device. In some examples, the first set of multiple beams are associated with a mmW radio frequency spectrum band.

Figure 12:
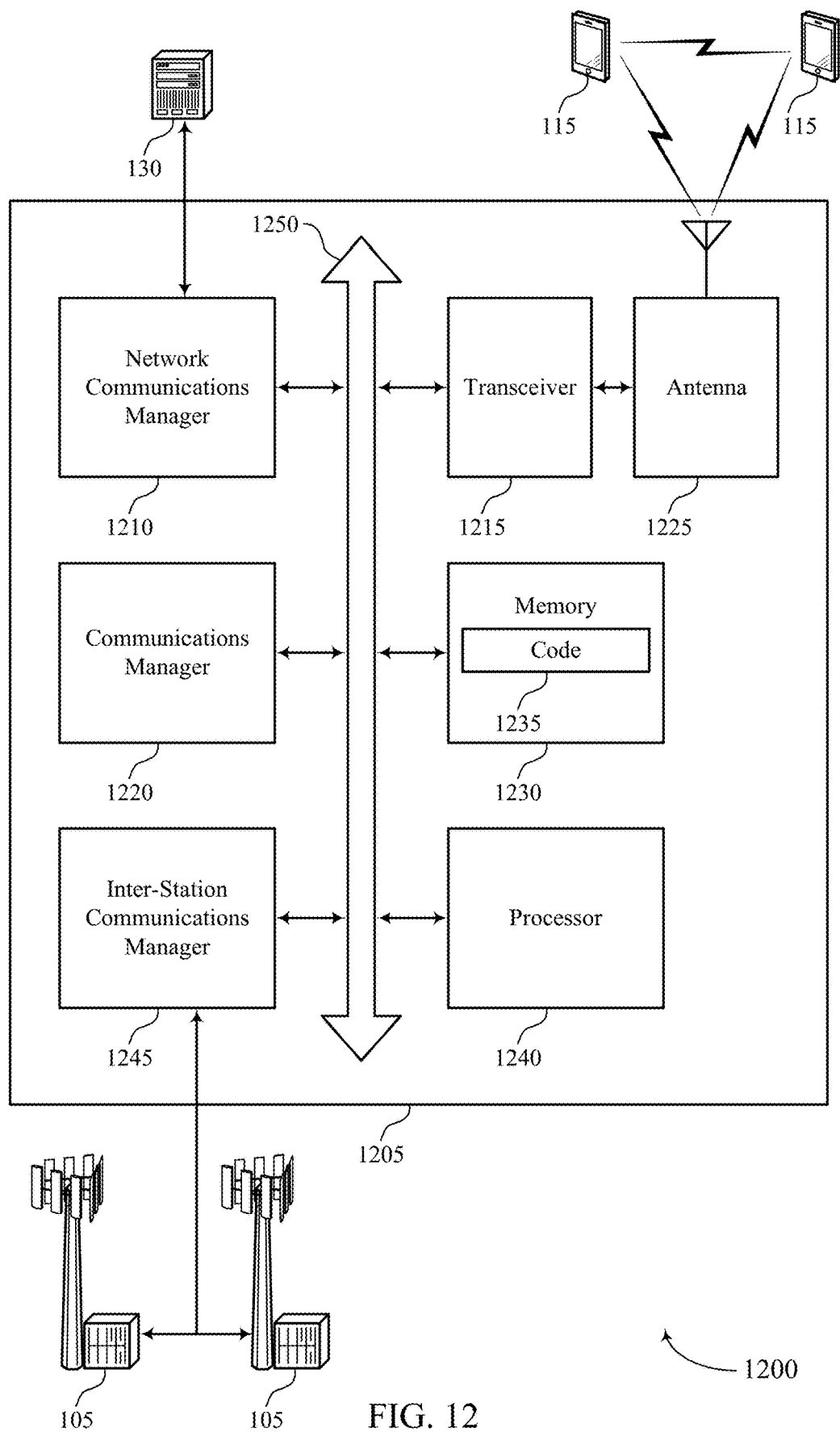
FIG. 12 shows a diagram of a system including a device that supports managing feedback information to enable RSRP prediction in accordance with aspects of the present disclosure.

FIG. 12 shows a diagram of a system 1200 including a device 1205 that supports managing feedback information to enable RSRP prediction in accordance with aspects of the present disclosure. The device 1205 may be an example of or include the components of a device 905, a device 1005, a base station 105, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting managing feedback information to enable RSRP prediction). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at the device 1205 in accordance with examples as disclosed herein. For example, the communications manager 1220 may be configured as or otherwise support a means for receiving a report indicating a first set of multiple beam angle measurement values determined at another device between at least two beams relative to a respective beam of a first set of multiple beams and a first phase difference measurement value determined at the other device between first post-beamformed channel phases using the at least two beams of the first set of multiple beams. The communications manager 1220 may be configured as or otherwise support a means for estimating an RSRP value for a respective frequency and time based on one or more of a second set of multiple beam angle measurement values determined at the device, a second phase difference measurement value determined at the device, and receiving the report. The communications manager 1220 may be configured as or otherwise support a means for performing a beam management operation based on estimating the RSRP value for the respective frequency and time. By including or configuring the communications manager 1220 in accordance with examples as described herein, the device 1205 may support techniques for improved communication reliability, reduced latency, and improved coordination between devices.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of managing feedback information to enable RSRP prediction as described herein, or the processor 1240 and the memory 1230 may be otherwise configured to perform or support such operations.

Figure 13:
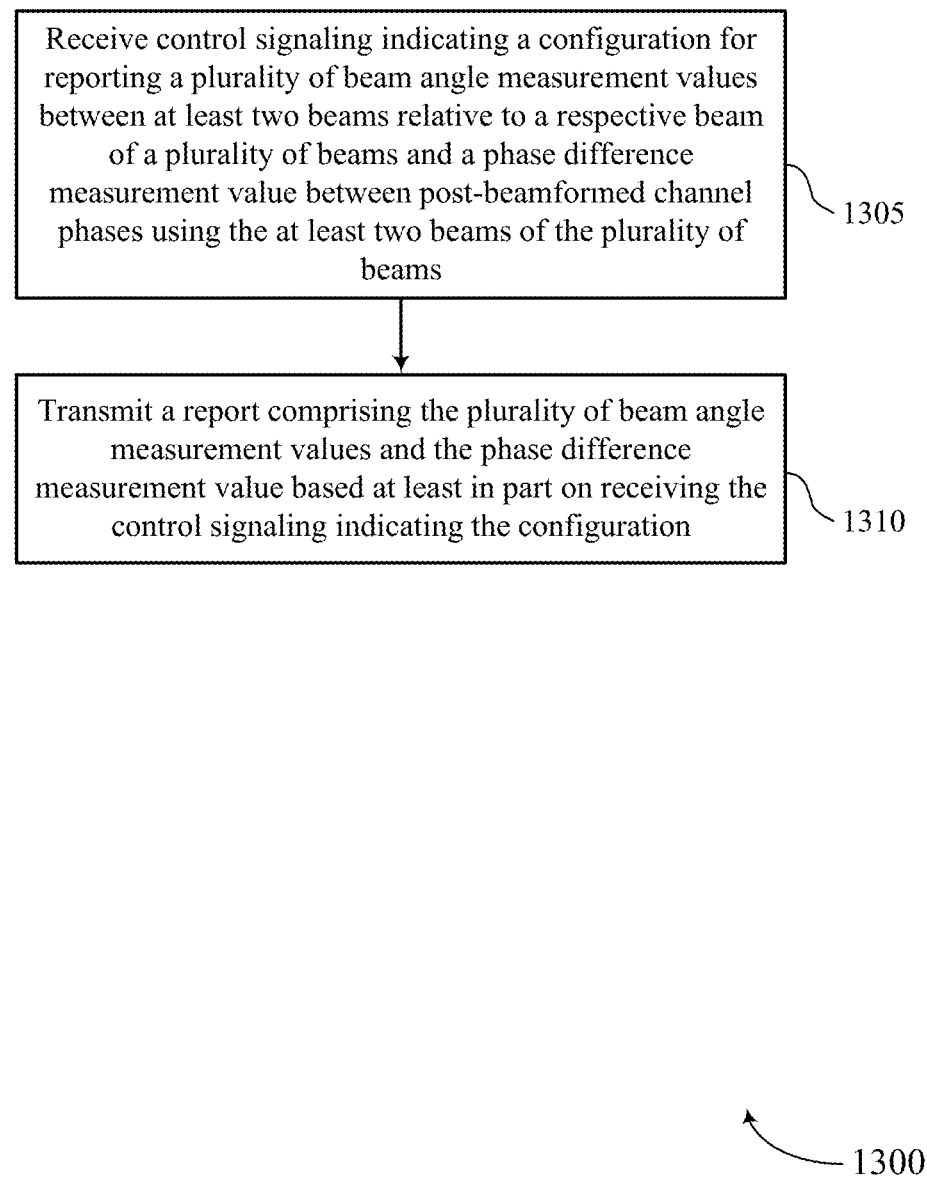
FIGS. 13 through 16 show flowcharts illustrating methods that support managing feedback information to enable RSRP prediction in accordance with aspects of the present disclosure.

FIG. 13 shows a flowchart illustrating a method 1300 that supports managing feedback information to enable RSRP prediction in accordance with aspects of the present disclosure. The operations of the method 1300 may be implemented by a UE or a base station or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving control signaling indicating a configuration for reporting a set of multiple beam angle measurement values between at least two beams relative to a respective beam of a set of multiple beams and a phase difference measurement value between post-beamformed channel phases using the at least two beams of the set of multiple beams. The operations of 1305 may be performed in accordance with examples as disclosed herein. In some examples, aspects of the operations of 1305 may be performed by a configuration component 725 as described with reference to FIG. 7.

At 1310, the method may include transmitting a report including the set of multiple beam angle measurement values and the phase difference measurement value based on receiving the control signaling indicating the configuration. The operations of 1310 may be performed in accordance with examples as disclosed herein. In some examples, aspects of the operations of 1310 may be performed by a report component 730 as described with reference to FIG. 7.

Figure 14:
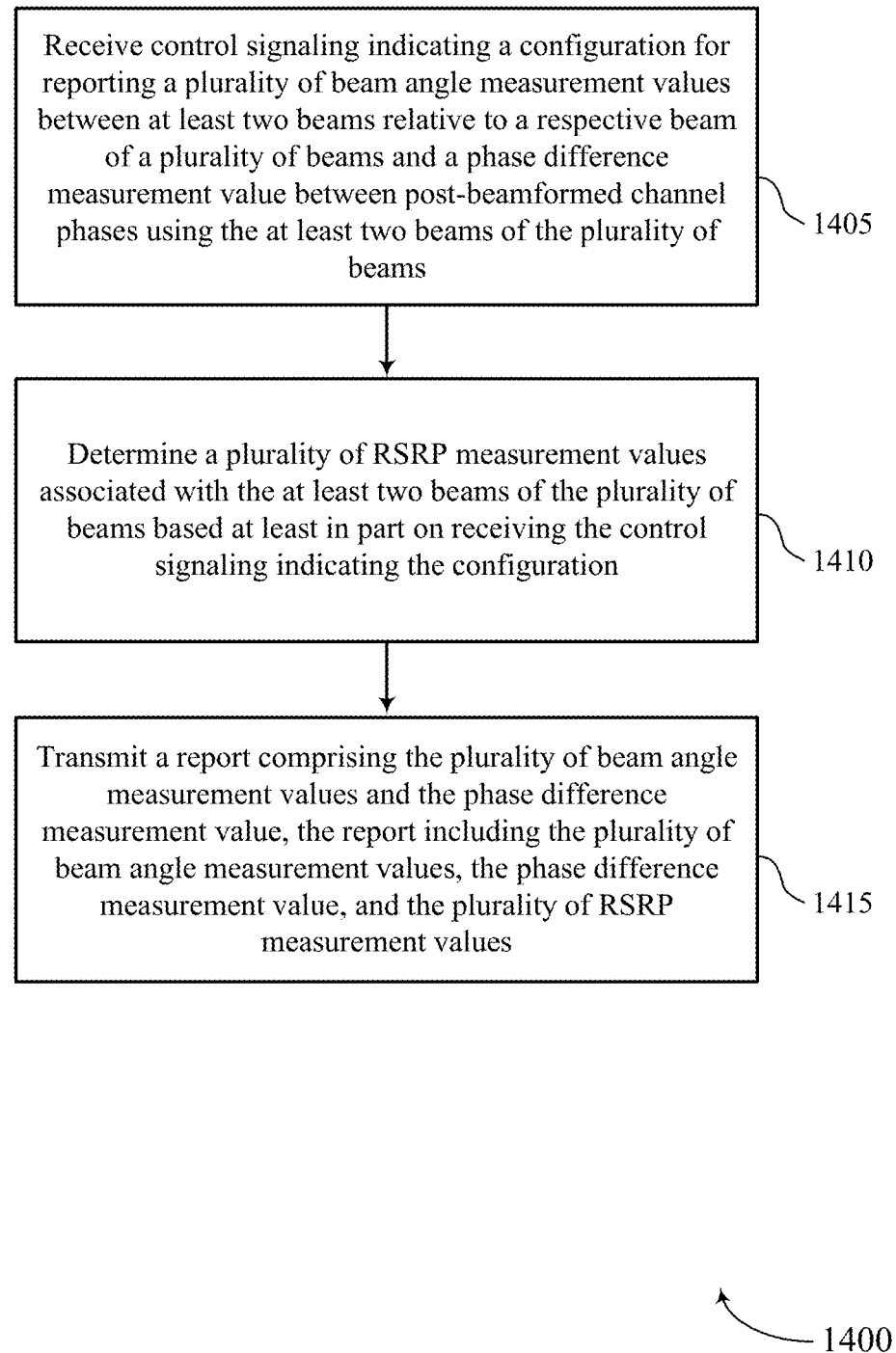

FIG. 14 shows a flowchart illustrating a method 1400 that supports managing feedback information to enable RSRP prediction in accordance with aspects of the present disclosure. The operations of the method 1400 may be implemented by a UE or a base station, or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving control signaling indicating a configuration for reporting a set of multiple beam angle measurement values between at least two beams relative to a respective beam of a set of multiple beams and a phase difference measurement value between post-beamformed channel phases using the at least two beams of the set of multiple beams. The operations of 1405 may be performed in accordance with examples as disclosed herein. In some examples, aspects of the operations of 1405 may be performed by a configuration component 725 as described with reference to FIG. 7.

At 1410, the method may include determining a set of multiple RSRP measurement values associated with the at least two beams of the set of multiple beams based on receiving the control signaling indicating the configuration, where transmitting the report includes. The operations of 1410 may be performed in accordance with examples as disclosed herein. In some examples, aspects of the operations of 1410 may be performed by a measurement component 735 as described with reference to FIG. 7.

At 1415, the method may include transmitting a report comprising the plurality of beam angle measurement values and the phase difference measurement value, the report including the plurality of beam angle measurement values, the phase difference measurement value, and the plurality of RSRP measurement values. The operations of 1415 may be performed in accordance with examples as disclosed herein. In some examples, aspects of the operations of 1415 may be performed by a report component 730 as described with reference to FIG. 7.

Figure 15:
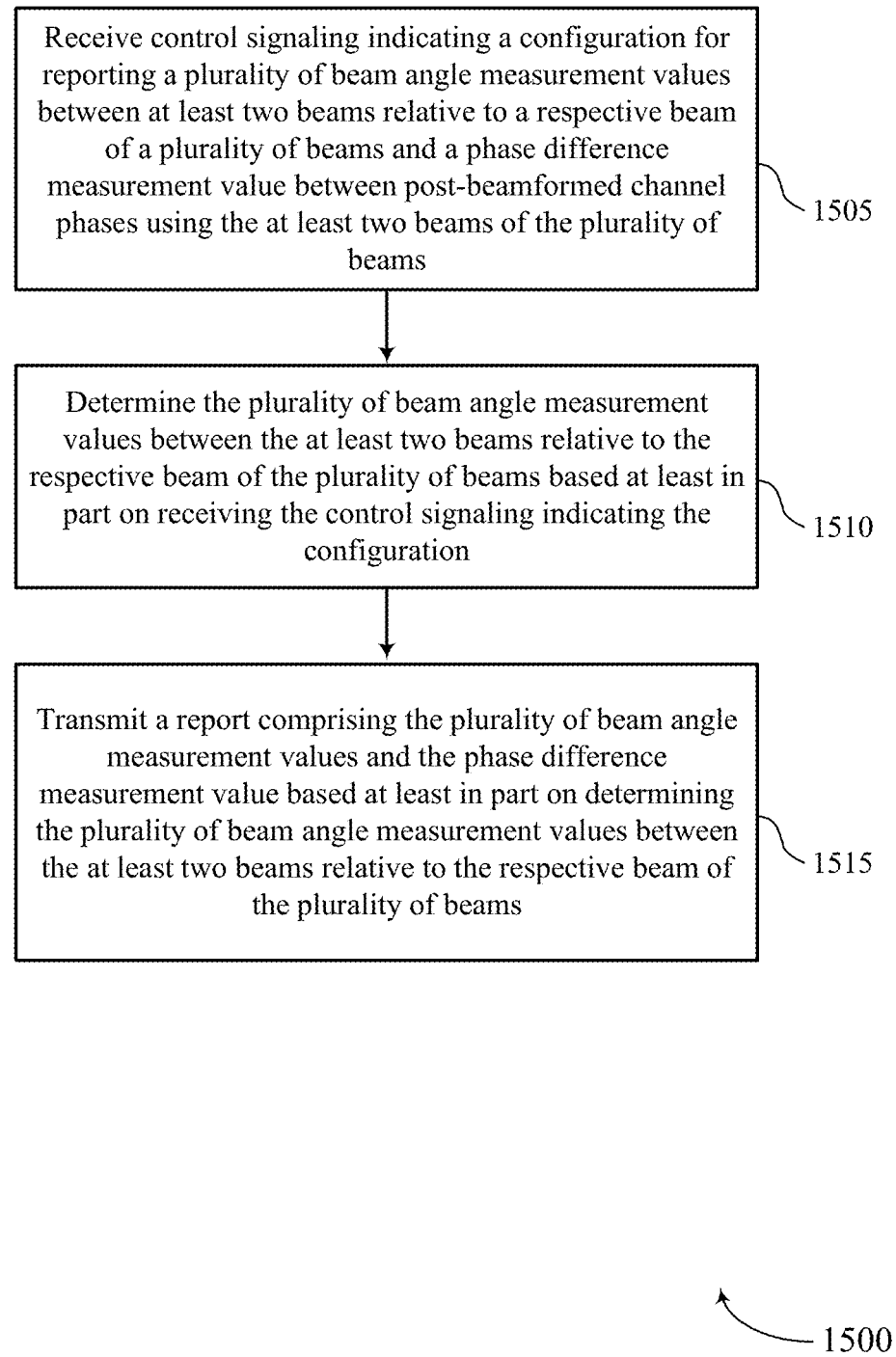

FIG. 15 shows a flowchart illustrating a method 1500 that supports managing feedback information to enable RSRP prediction in accordance with aspects of the present disclosure. The operations of the method 1500 may be implemented by a UE or a base station, or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving control signaling indicating a configuration for reporting a set of multiple beam angle measurement values between at least two beams relative to a respective beam of a set of multiple beams and a phase difference measurement value between post-beamformed channel phases using the at least two beams of the set of multiple beams. The operations of 1505 may be performed in accordance with examples as disclosed herein. In some examples, aspects of the operations of 1505 may be performed by a configuration component 725 as described with reference to FIG. 7.

At 1510, the method may include determining the set of multiple beam angle measurement values between the at least two beams relative to the respective beam of the set of multiple beams based on receiving the control signaling indicating the configuration. The operations of 1510 may be performed in accordance with examples as disclosed herein. In some examples, aspects of the operations of 1510 may be performed by a measurement component 735 as described with reference to FIG. 7.

At 1515, the method may include transmitting a report including the set of multiple beam angle measurement values and the phase difference measurement value based on determining the plurality of beam angle measurement values between the at least two beams relative to the respective beam of the plurality of beams. The operations of 1515 may be performed in accordance with examples as disclosed herein. In some examples, aspects of the operations of 1515 may be performed by a report component 730 as described with reference to FIG. 7.

Figure 16:
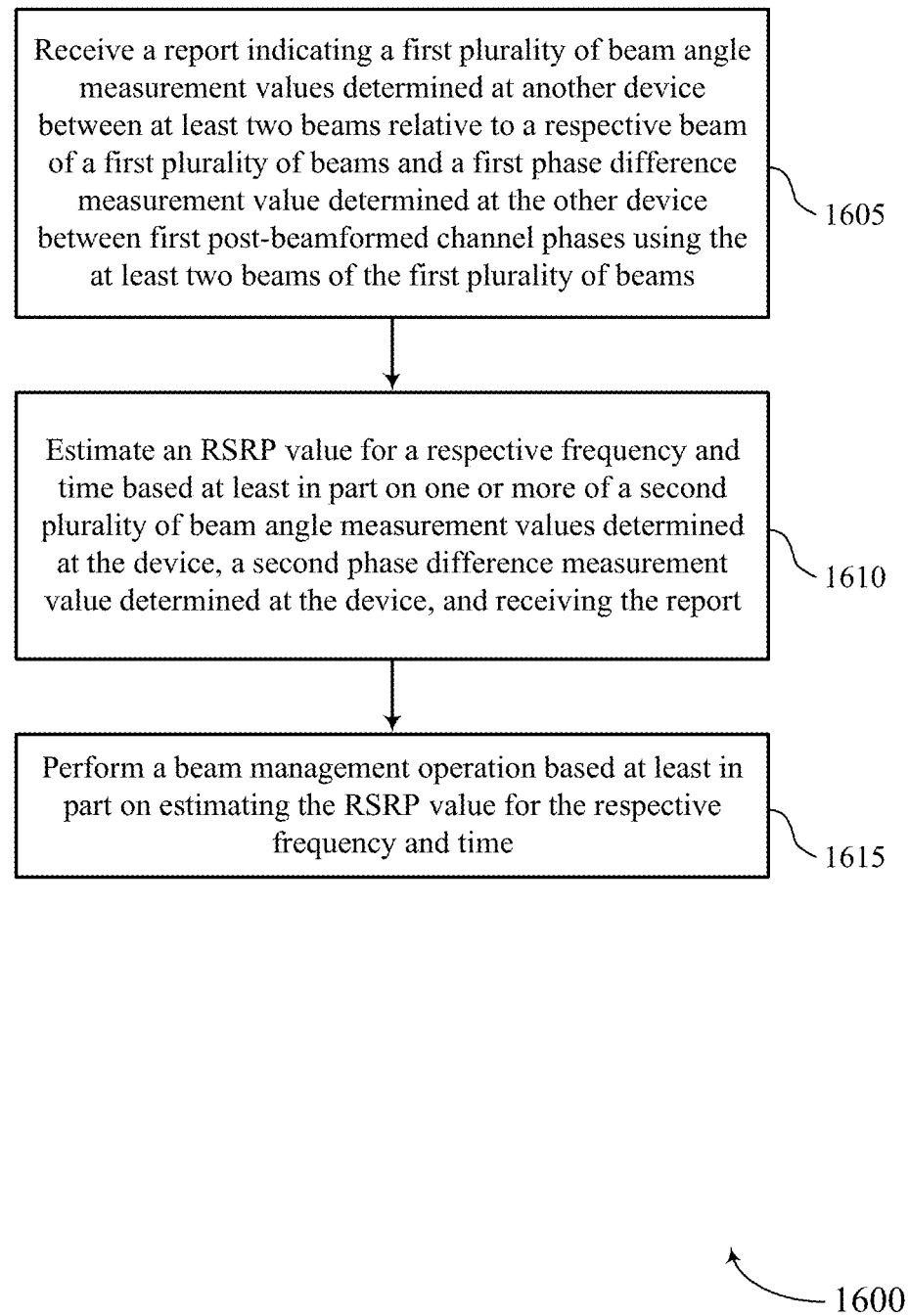

FIG. 16 shows a flowchart illustrating a method 1600 that supports managing feedback information to enable RSRP prediction in accordance with aspects of the present disclosure. The operations of the method 1600 may be implemented by a base station or a UE, or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include receiving a report indicating a first set of multiple beam angle measurement values determined at another device between at least two beams relative to a respective beam of a first set of multiple beams and a first phase difference measurement value determined at the other device between first post-beamformed channel phases using the at least two beams of the first set of multiple beams. The operations of 1605 may be performed in accordance with examples as disclosed herein. In some examples, aspects of the operations of 1605 may be performed by a report component 1125 as described with reference to FIG. 11.

At 1610, the method may include estimating an RSRP value for a respective frequency and time based on one or more of a second set of multiple beam angle measurement values determined at the device, a second phase difference measurement value determined at the device, and receiving the report. The operations of 1610 may be performed in accordance with examples as disclosed herein. In some examples, aspects of the operations of 1610 may be performed by an estimation component 1130 as described with reference to FIG. 11.

At 1615, the method may include performing a beam management operation based on estimating the RSRP value for the respective frequency and time. The operations of 1615 may be performed in accordance with examples as disclosed herein. In some examples, aspects of the operations of 1615 may be performed by a beam component 1135 as described with reference to FIG. 11.

The following provides an overview of aspects of the present disclosure:

Aspect 1: A method for wireless communication at a device, comprising: receiving control signaling indicating a configuration for reporting a plurality of beam angle measurement values between at least two beams relative to a respective beam of a plurality of beams and a phase difference measurement value between post-beamformed channel phases using the at least two beams of the plurality of beams; and transmitting a report comprising the plurality of beam angle measurement values and the phase difference measurement value based at least in part on receiving the control signaling indicating the configuration.

Aspect 2: The method of aspect 1, further comprising: determining a plurality of RSRP measurement values associated with the at least two beams of the plurality of beams based at least in part on receiving the control signaling indicating the configuration, wherein transmitting the report comprises: transmitting the plurality of beam angle measurement values, the phase difference measurement value, and the plurality of RSRP measurement values.

Aspect 3: The method of aspect 2, further comprising: enabling a beam training mode based at least in part on receiving the control signaling indicating the configuration, wherein determining the plurality of RSRP measurement values associated with the at least two beams of the plurality of beams is based at least in part on enabling the beam training mode.

Aspect 4: The method of any of aspects 1 through 3, further comprising: determining the plurality of beam angle measurement values between the at least two beams relative to the respective beam of the plurality of beams based at least in part on receiving the control signaling indicating the configuration, wherein transmitting the report is based at least in part on determining the plurality of beam angle measurement values between the at least two beams relative to the respective beam of the plurality of beams.

Aspect 5: The method of aspect 4, further comprising: applying an inverse cosine operation to an inner product of the at least two beams and the respective beam of the plurality of beams, wherein determining the plurality of beam angle measurement values between the at least two beams relative to the respective beam of the plurality of beams is based at least in part on applying the inverse cosine operation to the inner product of the at least two beams and the respective beam of the plurality of beams.

Aspect 6: The method of any of aspects 4 through 5, further comprising: determining one or more of a set of beam weights from an analog beamforming codebook associated with the device or a plurality of beam weights associated with the plurality of beams based at least in part on receiving the control signaling indicating the configuration, wherein determining the plurality of beam angle measurement values between the at least two beams relative to the respective beam of the plurality of beams is based at least in part on one or more of the set of beam weights from the analog beamforming codebook associated with the device or the plurality of beam weights associated with the plurality of beams.

Aspect 7: The method of any of aspects 1 through 6, further comprising: determining the phase difference measurement value between the post-beamformed channel phases using the at least two beams of the plurality of beams based at least in part on receiving the control signaling indicating the configuration, wherein transmitting the report is based at least in part on determining the phase difference measurement value between the post-beamformed channel phases using the at least two beams of the plurality of beams.

Aspect 8: The method of aspect 7, further comprising: determining a capability of the device based at least in part on the configuration, wherein determining the phase difference measurement value between the post-beamformed channel phases using the at least two beams of the plurality of beams is based at least in part on determining the capability of the device.

Aspect 9: The method of any of aspects 1 through 8, further comprising: receiving second control signaling indicating a plurality of beam angle measurement values determined at a second device between at least two beams relative to a respective beam of the plurality of beams and a phase difference measurement value determined at the second device between post-beamformed channel phases using the at least two beams of the plurality of beams.

Aspect 10: The method of aspect 9, further comprising: estimating an RSRP value for a respective frequency and time based at least in part on one or more of the plurality of beam angle measurement values, the phase difference measurement value, and receiving the second control signaling; and performing a beam management operation based at least in part on estimating the RSRP value for the respective frequency and time.

Aspect 11: The method of any of aspects 1 through 10, wherein the phase difference measurement value comprises an absolute phase difference measurement value.

Aspect 12: The method of any of aspects 1 through 11, wherein the device comprises a UE, a base station, a CPE, an IAB device, a repeater device, a reflect-array device, a relay device, or a sidelink device.

Aspect 13: The method of any of aspects 1 through 12, wherein the plurality of beams is associated with a mmW radio frequency spectrum band.

Aspect 14: A method for wireless communication at a device, comprising: receiving a report indicating a first plurality of beam angle measurement values determined at another device between at least two beams relative to a respective beam of a first plurality of beams and a first phase difference measurement value determined at the other device between first post-beamformed channel phases using the at least two beams of the first plurality of beams; estimating an RSRP value for a respective frequency and time based at least in part on one or more of a second plurality of beam angle measurement values determined at the device, a second phase difference measurement value determined at the device, and receiving the report; and performing a beam management operation based at least in part on estimating the RSRP value for the respective frequency and time.

Aspect 15: The method of aspect 14, further comprising: determining a plurality of RSRP measurement values associated with at least two beams of a second plurality of beams, wherein estimating the RSRP value is based at least in part on the plurality of RSRP measurement values associated with at least two beams of the second plurality of beams.

Aspect 16: The method of aspect 15, further comprising: enabling a beam training mode based at least in part on a configuration, wherein determining the plurality of RSRP measurement values associated with the at least two beams of the second plurality of beams is based at least in part on enabling the beam training mode.

Aspect 17: The method of any of aspects 14 through 16, further comprising: determining the second plurality of beam angle measurement values between the at least two beams relative to the respective beam of a second plurality of beams based at least in part on receiving the report, wherein estimating the RSRP value for the respective frequency and time is based at least in part on determining the second plurality of beam angle measurement values between the at least two beams relative to the respective beam of the second plurality of beams.

Aspect 18: The method of aspect 17, further comprising: applying an inverse cosine operation to an inner product of the at least two beams and the respective beam of the second plurality of beams, wherein determining the second plurality of beam angle measurement values between the at least two beams relative to the respective beam of the second plurality of beams is based at least in part on applying the inverse cosine operation to the inner product of the at least two beams and the respective beam of the second plurality of beams.

Aspect 19: The method of any of aspects 14 through 18, wherein the device comprises a UE, a base station, a CPE, an IAB device, a repeater device, a reflect-array device, a relay device, or a sidelink device.

Aspect 20: The method of any of aspects 14 through 19, wherein the first plurality of beams is associated with a mmW radio frequency spectrum band.

Aspect 21: An apparatus for wireless communication at a device, comprising a processor; memory coupled with the processor; and instructions stored in the memory and executable by the processor to cause the apparatus to perform a method of any of aspects 1 through 13.

Aspect 22: An apparatus for wireless communication at a device, comprising at least one means for performing a method of any of aspects 1 through 13.

Aspect 23: A non-transitory computer-readable medium storing code for wireless communication at a device, the code comprising instructions executable by a processor to perform a method of any of aspects 1 through 13.

Aspect 24: An apparatus for wireless communication at a device, comprising a processor; memory coupled with the processor; and instructions stored in the memory and executable by the processor to cause the apparatus to perform a method of any of aspects 14 through 20.

Aspect 25: An apparatus for wireless communication at a device, comprising at least one means for performing a method of any of aspects 14 through 20.

Aspect 26: A non-transitory computer-readable medium storing code for wireless communication at a device, the code comprising instructions executable by a processor to perform a method of any of aspects 14 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database, or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a device, comprising:
receiving control signaling indicating a configuration for reporting a plurality of beam angle measurement values between at least two beams relative to a respective beam of a plurality of beams and a phase difference measurement value between post-beamformed channel phases using the at least two beams of the plurality of beams; and
transmitting a report comprising the plurality of beam angle measurement values and the phase difference measurement value based at least in part on receiving the control signaling indicating the configuration.

2. The method of claim 1, further comprising:
determining a plurality of reference signal received power (RSRP) measurement values associated with the at least two beams of the plurality of beams based at least in part on receiving the control signaling indicating the configuration, wherein transmitting the report comprises:
transmitting the plurality of beam angle measurement values, the phase difference measurement value, and the plurality of RSRP measurement values.

3. The method of claim 2, further comprising:
enabling a beam training mode based at least in part on receiving the control signaling indicating the configuration,
wherein determining the plurality of RSRP measurement values associated with the at least two beams of the plurality of beams is based at least in part on enabling the beam training mode.

4. The method of claim 1, further comprising:
determining the plurality of beam angle measurement values between the at least two beams relative to the respective beam of the plurality of beams based at least in part on receiving the control signaling indicating the configuration,
wherein transmitting the report is based at least in part on determining the plurality of beam angle measurement values between the at least two beams relative to the respective beam of the plurality of beams.

5. The method of claim 4, further comprising:
applying an inverse cosine operation to an inner product of the at least two beams and the respective beam of the plurality of beams,
wherein determining the plurality of beam angle measurement values between the at least two beams relative to the respective beam of the plurality of beams is based at least in part on applying the inverse cosine operation to the inner product of the at least two beams and the respective beam of the plurality of beams.

6. The method of claim 4, further comprising:
determining one or more of a set of beam weights from an analog beamforming codebook associated with the device or a plurality of beam weights associated with the plurality of beams based at least in part on receiving the control signaling indicating the configuration,
wherein determining the plurality of beam angle measurement values between the at least two beams relative to the respective beam of the plurality of beams is based at least in part on one or more of the set of beam weights from the analog beamforming codebook associated with the device or the plurality of beam weights associated with the plurality of beams.

7. The method of claim 1, further comprising:
determining the phase difference measurement value between the post-beamformed channel phases using the at least two beams of the plurality of beams based at least in part on receiving the control signaling indicating the configuration,
wherein transmitting the report is based at least in part on determining the phase difference measurement value between the post-beamformed channel phases using the at least two beams of the plurality of beams.

8. The method of claim 7, further comprising:
determining a capability of the device based at least in part on the configuration,
wherein determining the phase difference measurement value between the post-beamformed channel phases using the at least two beams of the plurality of beams is based at least in part on determining the capability of the device.

9. The method of claim 1, further comprising:
receiving second control signaling indicating a plurality of beam angle measurement values determined at a second device between at least two beams relative to a respective beam of the plurality of beams and a phase difference measurement value determined at the second device between post-beamformed channel phases using the at least two beams of the plurality of beams.

10. The method of claim 9, further comprising:
estimating a reference signal received power (RSRP) value for a respective frequency and time based at least in part on one or more of the plurality of beam angle measurement values, the phase difference measurement value, and receiving the second control signaling; and
performing a beam management operation based at least in part on estimating the RSRP value for the respective frequency and time.

11. The method of claim 1, wherein the phase difference measurement value comprises an absolute phase difference measurement value.

12. The method of claim 1, wherein the device comprises a user equipment (UE), a base station, a customer premise equipment (CPE), an integrated access and backhaul (IAB) device, a repeater device, a reflect-array device, a relay device, or a sidelink device.

13. The method of claim 1, wherein the plurality of beams is associated with a millimeter radio frequency spectrum band.

14. A method for wireless communication at a device, comprising:
receiving a report indicating a first plurality of beam angle measurement values determined at another device between at least two beams relative to a respective beam of a first plurality of beams and a first phase difference measurement value determined at the other device between first post-beamformed channel phases using the at least two beams of the first plurality of beams;
estimating a reference signal received power (RSRP) value for a respective frequency and time based at least in part on one or more of a second plurality of beam angle measurement values determined at the device, a second phase difference measurement value determined at the device, and receiving the report; and
performing a beam management operation based at least in part on estimating the RSRP value for the respective frequency and time.

15. The method of claim 14, further comprising:
determining a plurality of RSRP measurement values associated with at least two beams of a second plurality of beams,
wherein estimating the RSRP value is based at least in part on the plurality of RSRP measurement values associated with at least two beams of the second plurality of beams.

16. The method of claim 15, further comprising:
enabling a beam training mode based at least in part on a configuration,
wherein determining the plurality of RSRP measurement values associated with the at least two beams of the second plurality of beams is based at least in part on enabling the beam training mode.

17. The method of claim 14, further comprising:
determining the second plurality of beam angle measurement values between the at least two beams relative to the respective beam of a second plurality of beams based at least in part on receiving the report,
wherein estimating the RSRP value for the respective frequency and time is based at least in part on determining the second plurality of beam angle measurement values between the at least two beams relative to the respective beam of the second plurality of beams.

18. The method of claim 17, further comprising:
applying an inverse cosine operation to an inner product of the at least two beams and the respective beam of the second plurality of beams,
wherein determining the second plurality of beam angle measurement values between the at least two beams relative to the respective beam of the second plurality of beams is based at least in part on applying the inverse cosine operation to the inner product of the at least two beams and the respective beam of the second plurality of beams.

19. The method of claim 14, wherein the device comprises a user equipment (UE), a base station, a customer premise equipment (CPE), an integrated access and backhaul (TAB) device, a repeater device, a reflect-array device, a relay device, or a sidelink device.

20. The method of claim 14, wherein the first plurality of beams is associated with a millimeter radio frequency spectrum band.

21. An apparatus for wireless communication, comprising:
a processor;
memory coupled with the processor; and
instructions stored in the memory and executable by the processor to cause the apparatus to:
receive control signaling indicating a configuration for reporting a plurality of beam angle measurement values between at least two beams relative to a respective beam of a plurality of beams and a phase difference measurement value between post-beamformed channel phases using the at least two beams of the plurality of beams; and
transmit a report comprising the plurality of beam angle measurement values and the phase difference measurement value based at least in part on receiving the control signaling indicating the configuration.

22. The apparatus of claim 21, wherein the instructions are further executable by the processor to cause the apparatus to:
determine a plurality of reference signal received power (RSRP) measurement values associated with the at least two beams of the plurality of beams based at least in part on receiving the control signaling indicating the configuration, wherein the instructions to transmit the report are further executable by the processor to cause the apparatus to:
transmit the plurality of beam angle measurement values, the phase difference measurement value, and the plurality of RSRP measurement values.

23. The apparatus of claim 22, wherein the instructions are further executable by the processor to cause the apparatus to:
enable a beam training mode based at least in part on receiving the control signaling indicating the configuration,
wherein the instruction to determine the plurality of RSRP measurement values associated with the at least two beams of the plurality of beams are further executable by the processor based at least in part on enabling the beam training mode.

24. The apparatus of claim 21, wherein the instructions are further executable by the processor to cause the apparatus to:
determine the plurality of beam angle measurement values between the at least two beams relative to the respective beam of the plurality of beams based at least in part on receiving the control signaling indicating the configuration,
wherein the instructions to transmit the report are further executable by the processor based at least in part on determining the plurality of beam angle measurement values between the at least two beams relative to the respective beam of the plurality of beams.

25. The apparatus of claim 24, wherein the instructions are further executable by the processor to cause the apparatus to:
apply an inverse cosine operation to an inner product of the at least two beams and the respective beam of the plurality of beams,
wherein the instructions to determine the plurality of beam angle measurement values between the at least two beams relative to the respective beam of the plurality of beams are further executable by the processor based at least in part on applying the inverse cosine operation to the inner product of the at least two beams and the respective beam of the plurality of beams.

26. The apparatus of claim 24, wherein the instructions are further executable by the processor to cause the apparatus to:
determine one or more of a set of beam weights from an analog beamforming codebook associated with the device or a plurality of beam weights associated with the plurality of beams based at least in part on receiving the control signaling indicating the configuration,
wherein the instructions to determine the plurality of beam angle measurement values between the at least two beams relative to the respective beam of the plurality of beams are further executable by the processor based at least in part on one or more of the set of beam weights from the analog beamforming codebook associated with the device or the plurality of beam weights associated with the plurality of beams.

27. An apparatus for wireless communication, comprising:
a processor;
memory coupled with the processor; and
instructions stored in the memory and executable by the processor to cause the apparatus to:

receive a report indicating a first plurality of beam angle measurement values determined at another device between at least two beams relative to a respective beam of a first plurality of beams and a first phase difference measurement value determined at the other device between first post-beamformed channel phases using the at least two beams of the first plurality of beams;

estimate a reference signal received power (RSRP) value for a respective frequency and time based at least in part on one or more of a second plurality of beam angle measurement values determined at the device, a second phase difference measurement value determined at the device, and receiving the report; and perform a beam management operation based at least in part on estimating the RSRP value for the respective frequency and time.

28. The apparatus of claim 27, wherein the instructions are further executable by the processor to cause the apparatus to:

determine a plurality of RSRP measurement values associated with at least two beams of a second plurality of beams, wherein the instructions to estimate the RSRP value are further executable by the processor based at least in part on the plurality of RSRP measurement values associated with at least two beams of the second plurality of beams.

29. The apparatus of claim 28, wherein the instructions are further executable by the processor to cause the apparatus to:

enable a beam training mode based at least in part on a configuration, wherein the instructions to determine the plurality of RSRP measurement values associated with the at least two beams of the second plurality of beams are further executable by the processor based at least in part on enabling the beam training mode.

30. The apparatus of claim 27, wherein the instructions are further executable by the processor to cause the apparatus to:

determine the second plurality of beam angle measurement values between the at least two beams relative to the respective beam of a second plurality of beams based at least in part on receiving the report, wherein the instructions to estimate the RSRP value for the respective frequency and time are further executable by the processor based at least in part on determining the second plurality of beam angle measurement values between the at least two beams relative to the respective beam of the second plurality of beams.

* * * * *